United States Patent
Sun et al.

(10) Patent No.: US 10,767,027 B1
(45) Date of Patent: Sep. 8, 2020

(54) MAGNETICALLY-RECOVERABLE CATALYSTS FOR DEPOLYMERIZATION

(71) Applicants: National Technology & Engineering Solutions of Sandia, LLC, Albuquerque, NM (US); The Regents of the University of California, Oakland, CA (US)

(72) Inventors: Jian Sun, Albany, CA (US); Blake A. Simmons, San Francisco, CA (US); Seema Singh, Clarksburg, MD (US)

(73) Assignees: National Technology & Engineering Solutions of Sandia, LLC, Albuquerque, NM (US); The Regents of the University of California, Oakland, CA (US)

( * ) Notice: Subject to any disclaimer, the term of this patent is extended or adjusted under 35 U.S.C. 154(b) by 0 days.

(21) Appl. No.: 16/656,245

(22) Filed: Oct. 17, 2019

Related U.S. Application Data

(60) Provisional application No. 62/749,549, filed on Oct. 23, 2018.

(51) Int. Cl.
| | | |
|---|---|---|
| *C08J 11/28* | (2006.01) | |
| *B01J 31/16* | (2006.01) | |
| *B01J 31/28* | (2006.01) | |
| *B01J 23/745* | (2006.01) | |
| *B01J 35/00* | (2006.01) | |

(52) U.S. Cl.
CPC ............ *C08J 11/28* (2013.01); *B01J 23/745* (2013.01); *B01J 31/1691* (2013.01); *B01J 31/28* (2013.01); *B01J 35/0013* (2013.01); *B01J 35/0033* (2013.01); *B01J 2231/005* (2013.01); *B01J 2531/002* (2013.01); *C08J 2367/02* (2013.01)

(58) Field of Classification Search
CPC ..... C08J 11/00; C08J 2367/02; B01J 31/1691; B01J 35/0013; B01J 35/0033; B01J 31/28; B01J 23/745; B01J 2531/002; B01J 2231/005
USPC .......................................................... 560/79
See application file for complete search history.

(56) References Cited

U.S. PATENT DOCUMENTS

| | | | |
|---|---|---|---|
| 6,869,015 | B2 | 3/2005 | Cummings et al. |
| 7,022,861 | B1 | 4/2006 | McElhanon et al. |
| 7,253,008 | B2 | 8/2007 | Rucker et al. |
| 7,264,962 | B1 | 9/2007 | Simmons et al. |
| 7,351,380 | B2 | 4/2008 | Simmons et al. |
| 7,351,837 | B1 | 4/2008 | McElhanon et al. |
| 7,358,221 | B1 | 4/2008 | Jamison et al. |
| 7,378,533 | B1 | 5/2008 | McElhanon et al. |
| 7,390,377 | B1 | 6/2008 | Wallow et al. |
| 7,419,574 | B2 | 9/2008 | Cummings et al. |
| 7,485,343 | B1 | 2/2009 | Branson et al. |
| 7,556,945 | B1 | 7/2009 | Simmons et al. |

(Continued)

OTHER PUBLICATIONS

Aldabalde V et al., "Organocatalyzed decarboxylation of naturally occurring cinnamic acids: potential role in flavoring chemicals production," *Open J. Phys. Chem.* 2011;1(3):85-93.

(Continued)

*Primary Examiner* — Deborah D Carr
(74) *Attorney, Agent, or Firm* — Helen S. Baca

(57) ABSTRACT

The present invention relates, in part, to methods for depolymerizing a polymer, in which the method includes use of a magnetic catalyst. The magnetic catalyst can include, e.g., a ore-shell particle, such as a particle having a magnetic core and a shell including a metal-organic framework.

20 Claims, 7 Drawing Sheets

(56) References Cited

U.S. PATENT DOCUMENTS

| | | | |
|---|---|---|---|
| 7,560,028 B1 | 7/2009 | Simmons et al. | |
| 7,595,349 B1 | 9/2009 | McElhanon et al. | |
| 7,608,461 B1 | 10/2009 | Simmons et al. | |
| 7,622,596 B1 | 11/2009 | McElhanon et al. | |
| 7,666,289 B2 | 2/2010 | Simmons et al. | |
| 7,678,256 B2 | 3/2010 | Davalos et al. | |
| 7,811,439 B1 | 10/2010 | Simmons et al. | |
| 7,985,868 B1 | 7/2011 | Bauer et al. | |
| 8,257,568 B1 | 9/2012 | Simmons et al. | |
| 8,257,571 B1 | 9/2012 | Cummings et al. | |
| 8,481,974 B1 | 7/2013 | Davis et al. | |
| 8,808,588 B1 | 8/2014 | Simmons et al. | |
| 9,157,130 B2 | 10/2015 | Brennan et al. | |
| 9,322,042 B2 | 4/2016 | Sapra et al. | |
| 9,376,728 B2 | 6/2016 | Zhang et al. | |
| 9,624,482 B2 | 4/2017 | Sapra et al. | |
| 9,725,749 B2 | 8/2017 | Chen et al. | |
| 9,765,044 B2 | 9/2017 | Socha et al. | |
| 9,803,182 B2 | 10/2017 | Gladden et al. | |
| 9,862,982 B2 | 1/2018 | Zhang et al. | |
| 10,112,916 B2 | 10/2018 | Sathitsuksanoh et al. | |
| 10,155,735 B2 | 12/2018 | Socha et al. | |
| 10,208,076 B2 | 2/2019 | Singh et al. | |
| 10,233,292 B2 | 3/2019 | Singh et al. | |
| 10,240,180 B2 | 3/2019 | Northen et al. | |
| 10,358,685 B2 | 7/2019 | Sun et al. | |
| 10,378,000 B2 | 8/2019 | Gladden et al. | |
| 2003/0098357 A1 | 5/2003 | Cummings et al. | |
| 2004/0211669 A1 | 10/2004 | Cummings et al. | |
| 2005/0100712 A1 | 5/2005 | Simmons et al. | |
| 2005/0136538 A1 | 6/2005 | Pathak et al. | |
| 2005/0151371 A1 | 7/2005 | Simmons et al. | |
| 2006/0141484 A1 | 6/2006 | Rucker et al. | |
| 2006/0163143 A1 | 7/2006 | Chirica et al. | |
| 2006/0201868 A1 | 9/2006 | Simmons et al. | |
| 2008/0105565 A1 | 5/2008 | Davalos et al. | |
| 2009/0045064 A1 | 2/2009 | Simmons et al. | |
| 2011/0207182 A1 | 8/2011 | Sapra et al. | |
| 2012/0129227 A1 | 5/2012 | Sapra et al. | |
| 2012/0225797 A1 | 9/2012 | Northen et al. | |
| 2012/0301948 A1 | 11/2012 | Brennan et al. | |
| 2012/0315695 A1 | 12/2012 | Brennan et al. | |
| 2013/0023015 A1 | 1/2013 | Zhang et al. | |
| 2013/0183739 A1 | 7/2013 | Singh et al. | |
| 2014/0154752 A1 | 6/2014 | Chen et al. | |
| 2015/0122246 A1 | 5/2015 | Sun et al. | |
| 2015/0218543 A1 | 8/2015 | Gladden et al. | |
| 2015/0322214 A1 | 11/2015 | Singh et al. | |
| 2016/0031843 A1 | 2/2016 | Socha et al. | |
| 2016/0122379 A1 | 5/2016 | Singh et al. | |
| 2016/0176838 A1 | 6/2016 | Sathitsuksanoh et al. | |
| 2017/0029856 A1 | 2/2017 | Zhang et al. | |
| 2017/0247729 A1 | 8/2017 | Liszka et al. | |
| 2017/0349561 A1 | 12/2017 | Socha et al. | |
| 2017/0349617 A1 | 12/2017 | Sun et al. | |
| 2017/0369918 A1 | 12/2017 | Sun et al. | |
| 2018/0057805 A1 | 3/2018 | Gladden et al. | |
| 2018/0346938 A1 | 12/2018 | Xu et al. | |
| 2018/0355392 A1 | 12/2018 | Ramakrishnan et al. | |
| 2019/0062293 A1 | 2/2019 | Sathitsuksanoh et al. | |
| 2019/0062519 A1 | 2/2019 | Dutta et al. | |
| 2019/0136281 A1 | 5/2019 | Gladden et al. | |
| 2019/0153011 A1 | 5/2019 | Singh et al. | |
| 2019/0169584 A1 | 6/2019 | Gladden et al. | |
| 2019/0241875 A1 | 8/2019 | Kohler et al. | |
| 2019/0263748 A1 | 8/2019 | Dutta et al. | |
| 2019/0292572 A1 | 9/2019 | Ramakrishnan et al. | |

OTHER PUBLICATIONS

Allendorf MD et al., "Luminescent metal-organic frameworks," *Chem. Soc. Rev.* 2009;38(5):1330-52.

Al-Sabagh AM et al., "Greener routes for recycling of polyethylene terephthalate," *Egypt. J. Pet.* 2016;25(1):53-64.

Baerlocher C, McCusker LB & Olson DH (eds.), "Atlas of zeolite framework types," Sixth Revised Edition, Elsevier, Amsterdam, 2007 (405 pp.).

Banerjee R et al., "High-throughput synthesis of zeolitic imidazolate frameworks and application to $CO_2$ capture," *Science* 2008;319(5865):939-43.

Bartolome L et al., "Superparamagnetic $\gamma$-$Fe_2O_3$ nanoparticles as an easily recoverable catalyst for the chemical recycling of PET," *Green Chem.* 2014;16(1):279-86.

Bhattacharjee S et al., "Zeolitic imidazolate frameworks: synthesis, functionalization, and catalytic/adsorption applications," *Catal. Surv. Asia* 2014;18:101-27.

Brown AJ et al., "Separation membranes: interfacial microfluidic processing of metal-organic framework hollow fiber membranes," *Science* 2014;345(6192):72-5.

Chang N et al., "Zeolitic imidazolate framework-8 nanocrystal coated capillary for molecular sieving of branched alkanes from linear alkanes along with high-resolution chromatographic separation of linear alkanes," *J. Am. Chem. Soc.* 2010;132(39):13645-7.

Furukawa H et al., "The chemistry and applications of metal-organic frameworks," *Science* 2013;341(6149):1230444 (12 pp.).

Hertäg L et al., "Diffusion of $CH_4$ and $H_2$ in ZIF-8," *J. Membr. Sci.* 2011;377(1-2):36-41.

Hou J et al., "Fabrication of hierarchical composite microspheres of copper-doped $Fe_3O_4$©P4VP©ZIF-8 and their application in aerobic oxidation," *New J. Chem.* 2016;40(12):10127-35.

Kwon HT et al., "Heteroepitaxially grown zeolitic imidazolate framework membranes with unprecedented propylene/propane separation performances," *J. Am. Chem. Soc.* 2015;137(38):12304-11.

Lee J et al., "Metal-organic framework materials as catalyst," *Chem. Soc. Rev.* 2009;38(5):1450-9.

Li J et al., "Zeolitic imidazolate framework-8 with high efficiency in trace arsenate adsorption and removal from water," *J. Phys. Chem. C* 2014;118(47):27382-7.

Li S et al., "Zeolitic imidazolate framework-8 derived nanoporous carbon as an effective and recyclable adsorbent for removal of ciprofloxacin antibiotics from water," *J. Hazard. Mater.* 2017;321:711-9.

Liu p. et al., "Core-shell-structured $Fe_3O_4$/Pd©ZIF-8 catalyst with magnetic recyclability and size selectivity for the hydrogenation of alkenes," *J. Mater. Sci.* 2017;52(20):12121-30.

López-Fonseca R et al., "Kinetics of catalytic glycolysis of PET wastes with sodium carbonate," *Chem. Eng. J.* 2011;168(1):312-20.

Meek ST et al., "Metal-organic frameworks: a rapidly growing class of versatile nanoporous materials," *Adv. Mater.* 2011;23(2):249-67.

Min X et al., "$Fe_3O_4$©ZIF-8: a magnetic nanocomposite for highly efficient $UO_2^{2+}$ adsorption and selective $UO_2^{2+}/Ln^{3+}$ separation," *Chem. Commun.* 2017;53(30):4199-202.

Pan Y et al., "Rapid synthesis of zeolitic imidazolate framework-8 (ZIF-8) nanocrystals in an aqueous system," *Chem. Commun.* 2011;47(7):2071-3.

Pang F et al., "Controlled synthesis of $Fe_3O_4$/ZIF-8 nanoparticles for magnetically separable nanocatalysts," *Chem. Eur. J.* 2015;21(18):6879-87.

Park KS et al., "Exceptional chemical and thermal stability of zeolitic imidazolate frameworks," *Proc. Nat'l Acad. Sci. USA* 2006;103(27):10186-91.

Phan A et al., "Synthesis, structure, and carbon dioxide capture properties of zeolitic imidazolate frameworks," *Acc. Chem. Res.* 2010;43(1):58-67.

Rogge SMJ et al, "Metal-organic and covalent organic frameworks as single-site catalysts," *Chem. Soc. Rev.* 2017;46(11):3134-84.

Schejn a et al., "$Fe_3O_4$©ZIF-8L magnetically recoverable catalysts by loading $Fe_3O_4$ nanoparticles inside a zine imidazolate framework," *Dalton Trans.* 2015;44(22):10136-40.

Shah MS et al., "Hydrogen sulfide capture: from absorption in polar liquids to oxide, zeolite, and metal-organic framework adsorbents and membranes," *Chem. Rev.* 2017;117(14):9755-803.

Sinha V et al., "Pet waste management by chemical recycling: a review," *J. Polym. Environ.* 2010;18(1):8-25.

Song Q et al., "Zeolitic imidazolate framework (ZIF-8) based polymer nanocomposite membranes for gas separation," *Energ. Environ. Sci.* 2012;5(8):8359-69.

(56) References Cited

OTHER PUBLICATIONS

Stavila V et al., "MOF-based catalysts for selective hydrogenolysis of carbon-oxygen ether bonds," *ACS Catal.* 2016;6(1):55-9.

Stavila V et al., "MOF-based electronic and opto-electronic devices," *Chem. Soc. Rev.* 2014;43(16):5994-6010.

Sun J et al., "$CO_2$ enabled process integration for the production of cellulosic ethanol using bionic liquids," *Energy Environ. Sci.* 2016;9:2822-34.

Sun J et al., "One-pot integrated biofuel production using low-cost biocompatible protic ionic liquids," *Green Chem.* 2017;19:3152-63.

Sun J et al., "Solubilization and upgrading of high polyethylene terephthalate loadings in a low-cost bifunctional ionic liquid," *ChemSusChem* 2018;11(4):781-92.

Suo Q et al., "The glycolysis of poly(ethylene terephthalate) promoted by metal organic framework (MOF) catalysts," *Catal. Lett.* 2017;147(1):240-52.

Wang H et al., "Degradation of poly(ethylene terephthalate) using ionic liquids," *Green Chem.* 2009;11(10):1568-75.

Wang Q et al., "Deep eutectic solvents as highly active catalysts for the fast and mild glycolysis of poly(ethylene terephthalate) (PET)," *Green Chem.* 2015;17(4):2473-9.

Wang Q et al., "First-row transition metal-containing ionic liquids as highly active catalysts for the glycolysis of poly(ethylene terephthalate) (PET)," *ACS Sustainable Chem. Eng.* 2015;3(2):340-8.

Xuan S et al., "Synthesis of biocompatible, mesoporous $Fe_3O_4$ nano/microspheres with large surface area for magnetic resonance imaging and therapeutic applications," *ACS Appl. Mater. Interfaces* 2011;3(2):237-44.

Yang Q et al., "Metal-organic frameworks meet metal nanoparticles: synergistic effect for enhanced catalysis," *Chem. Soc. Rev.* 2017;46(15):4774-808.

Yavuz Ct et al., "Low-field magnetic separation of monodisperse $Fe_3O_4$ nanocrystals," *Science* 2006;314(5801):964-7.

Yoshida S et al., "A bacterium that degrades and assimilates poly(ethylene terephthalate)," *Science* 2016;351(6278):1196-9.

Zhang T et al., "Synthesis of $Fe_3O_4$©ZIF-8 magnetic core-shell microspheres and their potential application in a capillary microreactor," *Chem. Eng. J.* 2013;228:398-404.

Zhang Y et al., "Tunable chiral metal organic frameworks toward visible light-driven asymmetric catalysis," *Sci. Adv.* 2017;3(8):e1701162 (7 pp.).

Zhou X et al., "Effective catalysis of poly(ethylene terephthalate) (PET) degradation by metallic acetate ionic liquids," *Pure Appl. Chem.* 2012;84(3):789-801.

US 10,767,027 B1

MAGNETICALLY-RECOVERABLE CATALYSTS FOR DEPOLYMERIZATION

CROSS-REFERENCE TO RELATED APPLICATION

This application claims the benefit of U.S. Provisional Application No. 62/749,549, filed Oct. 23, 2019, which is hereby incorporated by reference in its entirety.

STATEMENT OF GOVERNMENT INTEREST

This invention was made with Government support under Contract no. DE-AC02-05CH11231 awarded by the United States Department of Energy and Contract No. DE-NA0003525 awarded by the United States Department of Energy/National Nuclear Security Administration. The Government has certain rights in the invention.

FIELD OF THE INVENTION

The present invention relates, in part, to methods for depolymerizing a polymer, in which the method includes use of a magnetic catalyst. The magnetic catalyst can include, e.g., a ore-shell particle, such as a particle having a magnetic core and a shell including a metal-organic framework.

BACKGROUND OF THE INVENTION

Metal-organic frameworks (MOFs) are materials having tunable pores, as well as thermal and chemical stability. These characteristics provide an attractive platform for various catalytic applications. In particular, there is a need for additional efficient catalysts that can be recycled and reused.

SUMMARY OF THE INVENTION

The present invention, in part, relates to use of magnetically-recoverable catalysts. In some embodiments, the method employs $Fe_3O_4$@ZIF-8 magnetic particles (e.g., microspheres) for use as a highly recyclable and efficient catalyst for the depolymerization of various polyesters (e.g., poly(ethylene terephthalate) (PET) polyesters) in the presence of a reactant (e.g., ethylene glycol (EG)). In one non-limiting embodiment, a $Fe_3O_4$@ZIF-8 catalyst provided 100% conversion of PET with 62% yield of a monomer (e.g., bis(2-hydroxyethyl) terephthalate) at 180° C. with minimal EG consumption under halide-free processing conditions. In addition to the catalytic effect, the presence of a magnetic core allowed for facile recovery of the catalyst from the glycolysis products, enabling the catalyst to be reused without appreciable loss of activity. The catalyst also exhibited applicability to depolymerization of various polyester polymers.

Accordingly, in a first aspect, the present invention features a method for depolymerizing a polymer, the method including: providing the polymer and a reactant in the presence of a magnetic catalyst; incubating the polymer and the magnetic catalyst at an elevated temperature (e.g., thereby forming a monomer within a reaction mixture); and applying a magnetic field, thereby separating the magnetic catalyst from the monomer and the reactant, if any.

In some embodiments, the method further includes (e.g., prior to the applying step): adding a solvent to the reaction mixture.

In a second aspect, the present invention features a method for depolymerizing a polymer, the method including: providing a first polymer and a reactant in the presence of a magnetic catalyst, wherein the magnetic catalyst comprises a magnetic core and a shell comprising a metal-organic framework; incubating the first polymer and the magnetic catalyst at an elevated temperature, thereby forming a first monomer within a reaction mixture; applying a magnetic field, thereby separating the magnetic catalyst from the first monomer and the reactant, if any; and reusing the magnetic catalyst to depolymerize a second polymer, wherein the first polymer and the second polymer is the same or different.

In a third aspect, the present invention features a method for depolymerizing a polymer, the method including: providing a first polymer and a reactant in the presence of a magnetic catalyst, wherein the magnetic catalyst comprises a magnetic core and a shell comprising a metal-organic framework; incubating the first polymer and the magnetic catalyst at an elevated temperature, thereby forming a first monomer within a reaction mixture; adding a solvent to the reaction mixture; applying a magnetic field, thereby separating the magnetic catalyst from the first monomer and the reactant, if any; and reusing the magnetic catalyst to depolymerize a second polymer, wherein the first polymer and the second polymer is the same or different.

In any embodiment herein, the polymer includes poly(ethylene terephthalate) (PET), poly (ethylene terephthalate)-glycol (PETG), poly(trimethylene terephthalate) (PTT), poly(propylene terephthalate) (PPT), poly(butylene terephthalate) (PBT), poly(cyclohexylene terephthalate), poly(cyclohexylenedimethylene terephthalate) (PCT), or a copolymer thereof.

In any embodiment herein, the reactant includes an alcohol or a diol (e.g., ethylene glycol, diethylene glycol, triethylene glycol, cyclohexanediol, cyclohexanedimethanol, 1,4-butane diol, 1,3-propane diol, ethanol, and/or methanol).

In any embodiment herein, a ratio of the reactant to the polymer is of from about 1:5 (w/w) to about 5:1 (w/w) (e.g., of from about 1:4 (w/w) to 5:1 (w/w), 1:2 (w/w) to 5:1 (w/w), 1:1 (w/w) to 5:1 (w/w), 1:5 (w/w) to 4:1 (w/w), 1:4 (w/w) to 4:1 (w/w), 1:2 (w/w) to 4:1 (w/w), 1:1 (w/w) to 4:1 (w/w), 1:5 (w/w) to 3:1 (w/w), 1:4 (w/w) to 3:1 (w/w), 1:2 (w/w) to 3:1 (w/w), 1:1 (w/w) to 3:1 (w/w), 1:5 (w/w) to 2:1 (w/w), 1:4 (w/w) to 2:1 (w/w), 1:2 (w/w) to 2:1 (w/w), 1:1 (w/w) to 2:1 (w/w), 1:5 (w/w) to 1:1 (w/w), 1:4 (w/w) to 1:1 (w/w), or 1:2 (w/w) to 1:1 (w/w)).

In any embodiment herein, the magnetic core includes an iron oxide. In some embodiments, the magnetic core includes an anionic surface. In other embodiments, the magnetic core includes an iron oxide particle, a mixed metal oxide particle, a metal-decorated iron oxide particle, reduced metal particle, or a metal alloy particle. In yet other embodiments, the magnetic core includes a nanoparticle.

In any embodiment herein, the metal-organic framework includes a zeolitic imidazolate framework.

In any embodiment herein, the magnetic catalyst includes a core-shell nanoparticle or a core-shell microparticle. In some embodiments, the magnetic catalyst includes the core-shell microparticle having a nanoparticle as the magnetic core.

In any embodiment herein, a ratio of the magnetic catalyst to the polymer is of from about 1:4 (w/w) to about 1:100 (w/w) (e.g., of from about 1:5 (w/w) to 1:100 (w/w), 1:10 (w/w) to 1:100 (w/w), 1:20 (w/w) to 1:100 (w/w), 1:25 (w/w) to 1:100 (w/w), 1:30 (w/w) to 1:100 (w/w), 1:35 (w/w) to 1:100 (w/w), 1:40 (w/w) to 1:100 (w/w), 1:45

(w/w) to 1:100 (w/w), 1:50 (w/w) to 1:100 (w/w), 1:60 (w/w) to 1:100 (w/w), 1:70 (w/w) to 1:100 (w/w), 1:80 (w/w) to 1:100 (w/w), 1:90 (w/w) to 1:100 (w/w), 1:4 (w/w) to 1:90 (w/w), 1:5 (w/w) to 1:90 (w/w), 1:10 (w/w) to 1:90 (w/w), 1:20 (w/w) to 1:90 (w/w), 1:25 (w/w) to 1:90 (w/w), 1:30 (w/w) to 1:90 (w/w), 1:35 (w/w) to 1:90 (w/w), 1:40 (w/w) to 1:90 (w/w), 1:45 (w/w) to 1:90 (w/w), 1:50 (w/w) to 1:90 (w/w), 1:60 (w/w) to 1:90 (w/w), 1:70 (w/w) to 1:90 (w/w), 1:80 (w/w) to 1:90 (w/w), 1:4 (w/w) to 1:75 (w/w), 1:5 (w/w) to 1:75 (w/w), 1:10 (w/w) to 1:75 (w/w), 1:20 (w/w) to 1:75 (w/w), 1:25 (w/w) to 1:75 (w/w), 1:30 (w/w) to 1:75 (w/w), 1:35 (w/w) to 1:75 (w/w), 1:40 (w/w) to 1:75 (w/w), 1:45 (w/w) to 1:75 (w/w), 1:50 (w/w) to 1:75 (w/w), 1:60 (w/w) to 1:75 (w/w), 1:70 (w/w) to 1:75 (w/w), 1:4 (w/w) to 1:50 (w/w), 1:5 (w/w) to 1:50 (w/w), 1:10 (w/w) to 1:50 (w/w), 1:20 (w/w) to 1:50 (w/w), 1:25 (w/w) to 1:50 (w/w), 1:30 (w/w) to 1:50 (w/w), 1:35 (w/w) to 1:50 (w/w), 1:40 (w/w) to 1:50 (w/w), 1:45 (w/w) to 1:50 (w/w), 1:4 (w/w) to 1:25 (w/w), 1:5 (w/w) to 1:25 (w/w), 1:10 (w/w) to 1:25 (w/w), 1:20 (w/w) to 1:25 (w/w), 1:4 (w/w) to 1:10 (w/w), or 1:5 (w/w) to 1:10 (w/w)).

In any embodiment herein, the magnetic catalyst is present in an amount of from about 0.1 wt. % to about 20 wt. % (e.g., from about 0.1 wt. % to 1 wt. %, 0.1 wt. % to 2 wt. %, 0.1 wt. % to 5 wt. %, 0.1 wt. % to 10 wt. %, 0.1 wt. % to 15 wt. %, 0.2 wt. % to 1 wt. %, 0.2 wt. % to 2 wt. %, 0.2 wt. % to 5 wt. %, 0.2 wt. % to 10 wt. %, 0.2 wt. % to 15 wt. %, 0.2 wt. % to 20 wt. %, 0.3 wt. % to 1 wt. %, 0.3 wt. % to 2 wt. %, 0.3 wt. % to 5 wt. %, 0.3 wt. % to 10 wt. %, 0.3 wt. % to 15 wt. %, 0.3 wt. % to 20 wt. %, 0.4 wt. % to 1 wt. %, 0.4 wt. % to 2 wt. %, 0.4 wt. % to 5 wt. %, 0.4 wt. % to 10 wt. %, 0.4 wt. % to 15 wt. %, 0.4 wt. % to 20 wt. %, 0.5 wt. % to 1 wt. %, 0.5 wt. % to 2 wt. %, 0.5 wt. % to 5 wt. %, 0.5 wt. % to 10 wt. %, 0.5 wt. % to 15 wt. %, 0.5 wt. % to 20 wt. %, 0.6 wt. % to 1 wt. %, 0.6 wt. % to 2 wt. %, 0.6 wt. % to 5 wt. %, 0.6 wt. % to 10 wt. %, 0.6 wt. % to 15 wt. %, 0.6 wt. % to 20 wt. %, 0.7 wt. % to 1 wt. %, 0.7 wt. % to 2 wt. %, 0.7 wt. % to 5 wt. %, 0.7 wt. % to 10 wt. %, 0.7 wt. % to 15 wt. %, 0.7 wt. % to 20 wt. %, 0.8 wt. % to 1 wt. %, 0.8 wt. % to 2 wt. %, 0.8 wt. % to 5 wt. %, 0.8 wt. % to 10 wt. %, 0.8 wt. % to 15 wt. %, 0.8 wt. % to 20 wt. %, 0.9 wt. % to 1 wt. %, 0.9 wt. % to 2 wt. %, 0.9 wt. % to 5 wt. %, 0.9 wt. % to 10 wt. %, 0.9 wt. % to 15 wt. %, 0.9 wt. % to 20 wt. %, 1 wt. % to 2 wt. %, 1 wt. % to 5 wt. %, 1 wt. % to 10 wt. %, 1 wt. % to 15 wt. %, 1 wt. % to 20 wt. %, 1.5 wt. % to 2 wt. %, 1.5 wt. % to 5 wt. %, 1.5 wt. % to 10 wt. %, 1.5 wt. % to 15 wt. %, 1.5 wt. % to 20 wt. %, 2 wt. % to 5 wt. %, 2 wt. % to 10 wt. %, 2 wt. % to 15 wt. %, 2 wt. % to 20 wt. %, 2.5 wt. % to 5 wt. %, 2.5 wt. % to 10 wt. %, 2.5 wt. % to 15 wt. %, 2.5 wt. % to 20 wt. %, 3 wt. % to 5 wt. %, 3 wt. % to 10 wt. %, 3 wt. % to 15 wt. %, 3 wt. % to 20 wt. %, 3.5 wt. % to 5 wt. %, 3.5 wt. % to 10 wt. %, 3.5 wt. % to 15 wt. %, 3.5 wt. % to 20 wt. %, 4 wt. % to 5 wt. %, 4 wt. % to 10 wt. %, 4 wt. % to 15 wt. %, 4 wt. % to 20 wt. %, 4.5 wt. % to 5 wt. %, 4.5 wt. % to 10 wt. %, 4.5 wt. % to 15 wt. %, 4.5 wt. % to 20 wt. %, 5 wt. % to 10 wt. %, 5 wt. % to 15 wt. %, 5 wt. % to 20 wt. %, 5.5 wt. % to 10 wt. %, 5.5 wt. % to 15 wt. %, 5.5 wt. % to 20 wt. %, 6 wt. % to 10 wt. %, 6 wt. % to 15 wt. %, 6 wt. % to 20 wt. %, 6.5 wt. % to 10 wt. %, 6.5 wt. % to 15 wt. %, 6.5 wt. % to 20 wt. %, 7 wt. % to 10 wt. %, 7 wt. % to 15 wt. %, 7 wt. % to 20 wt. %, 7.5 wt. % to 10 wt. %, 7.5 wt. % to 15 wt. %, 7.5 wt. % to 20 wt. %, 8 wt. % to 10 wt. %, 8 wt. % to 15 wt. %, 8 wt. % to 20 wt. %, 8.5 wt. % to 10 wt. %, 8.5 wt. % to 15 wt. %, 8.5 wt. % to 20 wt. %, 9 wt. % to 10 wt. %, 9 wt. % to 15 wt. %, 9 wt. % to 20 wt. %, 9.5 wt. % to 10 wt. %, 9.5 wt. % to 15 wt. %, 9.5 wt. % to 20 wt. %, 10 wt. % to 15 wt. %, 10 wt. % to 20 wt. %, 10.5 wt. % to 15 wt. %, 10.5 wt. % to 20 wt. %, 12 wt. % to 15 wt. %, 12 wt. % to 20 wt. %, 12.5 wt. % to 15 wt. %, 12.5 wt. % to 20 wt. %, 15 wt. % to 20 wt. %, 15.5 wt. % to 20 wt. %, 18 wt. % to 20 wt. %, or 18.5 wt. % to 20 wt. %).

In any embodiment herein, the elevated temperature is of from about 120° C. to about 300° C. (e.g., about 120° C. to 175° C., 120° C. to 200° C., 120° C. to 225° C., 120° C. to 250° C., 120° C. to 275° C., 120° C. to 280° C., 120° C. to 290° C., 125° C. to 175° C., 125° C. to 200° C., 125° C. to 225° C., 125° C. to 250° C., 125° C. to 275° C., 125° C. to 280° C., 125° C. to 290° C., 125° C. to 300° C., 150° C. to 175° C., 150° C. to 200° C., 150° C. to 225° C., 150° C. to 250° C., 150° C. to 275° C., 150° C. to 280° C., 150° C. to 290° C., 150° C. to 300° C., 175° C. to 200° C., 175° C. to 225° C., 175° C. to 250° C., 175° C. to 275° C., 175° C. to 280° C., 175° C. to 290° C., 175° C. to 300° C., 200° C. to 225° C., 200° C. to 250° C., 200° C. to 275° C., 200° C. to 280° C., 200° C. to 290° C., 200° C. to 300° C., 250° C. to 275° C., 250° C. to 280° C., 250° C. to 290° C., 250° C. to 300° C., 275° C. to 280° C., 275° C. to 290° C., or 275° C. to 300° C.).

In any embodiment herein, the incubating step is conducted for a period of from about 0.5 hour to about 10 hours (e.g., from about 0.5 hour to 1 hour, 0.5 hour to 2 hours, 0.5 hour to 4 hours, 0.5 hour to 6 hours, 0.5 hour to 8 hours, 1 hour to 2 hours, 1 hour to 4 hours, 1 hour to 6 hours, 1 hour to 8 hours, 1 hour to 10 hours, 2 hours to 4 hours, 2 hours to 6 hours, 2 hours to 8 hours, 2 hours to 10 hours, 3 hours to 4 hours, 3 hours to 6 hours, 3 hours to 8 hours, 3 hours to 10 hours, 4 hours to 6 hours, 4 hours to 8 hours, 4 hours to 10 hours, 5 hours to 6 hours, 5 hours to 8 hours, 5 hours to 10 hours, 6 hours to 8 hours, 6 hours to 10 hours, or 8 hours to 10 hours).

In any embodiment herein, a magnetic flux density of the magnetic field is of from about 10 Gs to about 50,000 Gs (e.g., or any range described herein).

In any embodiment herein, the monomer includes a terephthalate, a hydroxyalkyl terephthalate, or a bis(hydroxyalkyl) terephthalate.

In any embodiment herein, the solvent includes an aqueous solvent.

Additional details follow.

Definitions

As used herein, the term "about" means +/−10% of any recited value. As used herein, this term modifies any recited value, range of values, or endpoints of one or more ranges.

By "micro" is meant having at least one dimension that is less than 1 mm and, optionally, equal to or larger than about 1 μm. For instance, a microstructure (e.g., any structure described herein) can have a length, width, height, cross-sectional dimension, circumference, radius (e.g., external or internal radius), or diameter that is less than 1 mm.

By "nano" is meant having at least one dimension that is less than 1 μm but equal to or larger than about 1 nm. For instance, a nanostructure (e.g., any structure described herein, such as a nanoparticle) can have a length, width, height, cross-sectional dimension, circumference, radius (e.g., external or internal radius), or diameter that is less than 1 μm but equal to or larger than 1 nm. In other instances, the nanostructure has a dimension that is of from about 1 nm to about 1 μm.

As used herein, the terms "top," "bottom," "upper," "lower," "above," and "below" are used to provide a relative relationship between structures. The use of these terms does not indicate or require that a particular structure must be located at a particular location in the apparatus.

Other features and advantages of the invention will be apparent from the following description and the claims.

DETAILED DESCRIPTION OF THE INVENTION

Figure 1A:
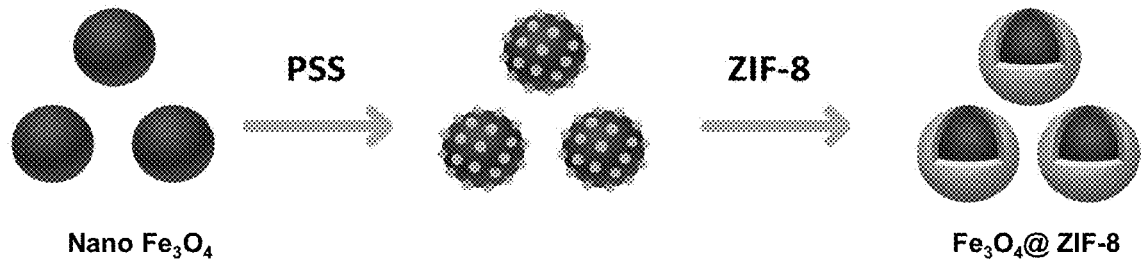
FIG. 1A-1E shows exemplary core-shell particles. Provided are a schematic route for the synthesis of magnetic $Fe_3O_4$@ZIF-8 (FIG. 1A); power X-ray detection (PXRD) analysis of the synthesized ZIF-8 before and after treatment in ethylene glycol (EG) (FIG. 1B); PXRD analysis of pure ZIF-8 powder, nanostructured $Fe_3O_4$ particles (diameter of <50 nm), and $Fe_3O_4$@ZIF-8 microspheres (FIG. 1C); a scanning electron microscopy (SEM) image of $Fe_3O_4$@ZIF-8 microspheres (FIG. 1D); and a transmission electron microscopy (TEM) image of $Fe_3O_4$@ZIF-8 microspheres (FIG. 1E).

The present invention relates to use of magnetically-recoverable catalysts. In some embodiments, the method employs core-shell magnetic particles (e.g., $Fe_3O_4$@ZIF-8 microspheres) as a catalyst for depolymerization reactions (e.g., depolymerization of a polyester in the presence of a reactant, such as an alcohol or a diol).

Magnetic Catalysts, Including Core-Shell Particles

The present invention can employ any useful magnetic catalyst. Exemplary magnetic catalysts can include a core-shell particle including a magnetic core and a shell having a metal-organic framework. The magnetic catalyst can include a particle, a nanoparticle, a microparticle, a nanospheres, a microsphere, a core-shell nanoparticle, or a core-shell microparticle.

Magnetic catalysts can be synthesized in any useful manner. In one non-limiting instance, the magnetic catalyst is formed by providing a magnetic core and then growing a shell around the core, where the shell includes a metal-organic framework (e.g., any herein). In some embodiments, the method includes providing a magnetic core having a cationic surface charge, an anionic surface charge, or a neutral surface. In other embodiments, each core-shell particle includes a single core surrounded by a shell. In yet other embodiments, each core-shell particle includes a plurality of cores, in which the plurality is surrounded by a shell.

A core-shell particle can have one or more additional layers (e.g., disposed between the core and the shell). Exemplary layers can include a polymer, a silica, or a metal. Such layers can be a monolayer or a multilayer. In another instance, the core can be modified to include a chemically-treated surface. Exemplary chemically-treated surfaces can include e.g., a polymer (e.g., poly(sulfone) (PS), poly(styrene sulfonate) (PSS), cellulose, chitosan, poly(vinyl alcohol) (PVA), poly(vinyl acetate) (PVAc), poly(vinyl chloride) (PVC), and/or poly(vinylpyrrolidone) (PVP)) and/or a silane (e.g., an amino silane, an alkoxy silane, etc.)

Magnetic Core

The catalysts herein can include a magnetic core, which can include any useful material in any useful form (e.g., microparticle, nanoparticle, microsphere, nanosphere, quantum dots, etc.). In some embodiments, the magnetic core includes an iron oxide (e.g., $Fe_3O_4$ or $\gamma$-$Fe_2O_3$), a mixed metal oxide or a doped metal oxide (e.g., with a $M^{2+}$ cation, such as $MnFe_2O_4$, $FeFe_2O_4$, $ZnFe_2O_4$, $Zn_{0.9}Fe_{0.1}Fe_2O_4$, $CoFe_2O_4$, $CuFe_2O_4$, and $NiFe_2O_4$), a metal-decorated iron oxide particle (e.g., Ni or Ru with $Fe_3O_4$ or $\gamma$-$Fe_2O_3$), a reduced metal (e.g., $Fe^0$, $Ni^0$, $Co^0$, or $Pd^0$), or a metal alloy (e.g., $SmCO_5$, $Fe_{12}Co_{88}$, $Fe_{40}Co_{60}$, and $Fe_{60}Co_{40}$), a ferrite (e.g., $MnaZn_{1-a}Fe_2O$ in which a is a number between 0 and 1, $Ni_aZn_{1-a}Fe_2O_4$ in which a is a number between 0 and 1, $CoFe_2O_4$, $BaFe_{12}O_{19}$, $Y_3Fe_5O_{12}$, or $SrFe_{12}O_{19}$), as well as doped forms thereof including one or more dopants (e.g., metal dopants, such as any $M^{2+}$ cation described herein). In other embodiments, the magnetic core includes an iron oxide particle, a ferrite particle, a mixed metal oxide particle, a metal-decorated iron oxide particle, a reduced metal particle, or a metal alloy particle, as well as doped forms thereof. The magnetic core can include any useful metal (e.g., gold (Au), silver (Ag), platinum (Pt), palladium (Pd), nickel (Ni), iron (Fe), cobalt (Co), copper (Cu), etc.).

Metal-Organic Framework (MOF)

The present invention includes the use of a catalyst having a MOF, which can be 3D (cage) or 2D (layered) framework types. MOFs are highly porous crystalline materials, with a very diverse structural and chemical profile. A large set of metal and organic linkers are available. As such, MOFs can be categorized following several criteria, including topology (e.g., MOFs with zeolitic topologies, such as zeolitic imidazolate frameworks (ZIFs), zeolite-like metal-organic frameworks (ZMOFs). In another instance, the MOF can be based on the organic linkers they include, e.g., carboxylate-based MOFs, phosphonate-based MOFs, N-based linker MOFs, and/or N—O-heterofunctional linkers based MOFs. Exemplary MOFs can include, e.g., IRMOFs series (MOF-5), MOF-74 series, Sandia Metal-Organic Frameworks (SMOFs) series, and zeolitic imidazolate framework (ZIF) series.

Exemplary ZIF series include but not limited to ZIF-4, ZIF-5, ZIF-6, ZIF-8, ZIF-10, and/or ZIF-11. A framework of a ZIF can have any useful chemical composition of a metal cation (e.g., iron (Fe), cobalt (Co), copper (Cu), aluminum (Al), and/or zinc (Zn) cations, such as $Fe^{3+}$, $Co^{2+}$, $Cu^{2+}$, $Al^{3+}$, or $Zn^{2+}$) and one or more linkers L. In one embodiment, the ZIF has a primary building unit of M-L-M, in which M is a tetrahedrally coordinated metal ion and L is a linker. In some embodiments, the structure has a M-L-M bonding angle of about 145°. The M-L bond can include a metal-oxygen bond or a metal-nitrogen bond.

Exemplary linkers include an anion. Further exemplary linker includes 2-imidazolate (IM), 2-methylimidazolate (mIM), 2-ethylimidazolate (eIM), 2-nitroimidazolate (nIM), 4-cyanoimidazolate (cnIM), 4,5-dichloroimidazolate (dcIM), imidazolate-2-carboxyaldehyde (Ica), benzimidazolate (bIm), purinate (Pur), 5-chlorobenzimidazolate (cbIM), 5-bromobenzimidazolate (brbIM), 5-methylbenzimidazolate (mBIM), 5-nitrobenzimidazole (nbIM), 4-azabenzimidazolate (4abIM), 5-azabenzimidazolate (5abIM), and 5,6-dimethylbenzimidazolate (dmbIM). Yet other exemplary linkers include benzene-1,4-dicarboxylate (BDC), benzene-1,3,5-carboxylate (BTC), etc.

In some non-limiting embodiments, the ZIF can have any useful topology defined by the metal cations that is identical to the zeolitic framework type SOD or RHO. SOD is a three letter framework type code for a sodalite structure type, and RHO is another three letter framework type code, as defined by the Structure Commission of the International Zeolite Association in the "Atlas of zeolite framework types," Ch Baerlocher, L B McCusker, and D H Olson, Sixth Revised Edition, Elsevier Amsterdam, 2007. In another embodiment, the MOF may be ZIF-4, ZIF-5, ZIF-8 (also known as Basolite® Z1200), ZIF-9, ZIF-10, ZIF-11, ZIF-12, ZIF-65, ZIF-67, ZIF-68, ZIF-69, ZIF-70, ZIF-71, ZIF-76, ZIF-78, ZIF-90, ZIF-95, and ZIF-100.

In another embodiment, the MOF (e.g., crystalline MOF) may be a highly porous coordination framework, HKUST-1. The framework of HKUST-1 is [$Cu_3$(benzene-1,3,5-carboxylate)$_2$] or [$Cu_3(BTC)_2$], also known as MOF-199, Cu-BTC, and Basolite™ C300 (Sigma Aldrich). It has interconnected [$Cu_2(O_2CR)_4$] units (where R comprises an optionally substituted aromatic ring), which create a three-dimensional system of channels with a pore size of 1 nanometer and an accessible porosity of about 40 percent in the solid. In yet another embodiment, the MOF is MOF-5, which is $Zn_4O$(1,4-benzodicarboxylate)$_3$ $Zn_4O(BDC)_3$ Polymers and Monomers The methods herein can be employed in the presence of any useful polymer to produce resultant monomers (e.g., in the presence of one or more reactants). Exemplary polymers include, e.g., polyesters. Non-limiting examples of polyesters include, e.g., poly(ethylene terephthalate) (PET), poly(ethylene terephthalate)-glycol (PETG), poly(trimethylene terephthalate) (PTT), poly(propylene terephthalate) (PPT), poly(butylene terephthalate) (PBT), poly(cyclohexylene terephthalate), poly(cyclohexylenedimethylene terephthalate) (PCT), or a copolymer thereof.

Exemplary monomers include, e.g., a terephthalate, a hydroxyalkyl terephthalate, or a bis(hydroxyalkyl) terephthalate. Non-limiting examples of monomers include bis(2-hydroxyethyl) terephthalate, bis(2-hydroxypropyl) terephthalate, bis(2-hydroxybutyl) terephthalate, bis(2-hydroxycyclohexyl) terephthalate, or bis(2-hydroxycyclohexenedimethyl) terephthalate.

Reactants

One or more reactants can be present during the reaction (e.g., a depolymerization reaction). Exemplary reactants include, e.g., diols or alcohols. Non-limiting examples of diols and alcohols include ethylene glycol (EG), diethylene glycol (DEG), triethylene glycol (TEG), cyclohexanediol, cyclohexanedimethanol, 1,4-butane diol, 1,3-propane diol, propanol, ethanol, and/or methanol, as well as combinations thereof.

Methods for Depolymerizing

The present invention relates to uses of a magnetically-coverable catalyst. In one non-limiting embodiment, the present invention relates to a method of depolymerizing a polymer (e.g., any herein) by employing a magnetic catalyst (e.g., a core-shell particle, such as any described herein).

In one non-limiting embodiment, the method includes providing a polymer and a reactant in the presence of a magnetic catalyst (e.g., any described herein); and incubating the polymer and the magnetic catalyst at an elevated temperature (e.g., thereby forming a monomer within a reaction mixture); and applying a magnetic field, thereby separating the magnetic catalyst from the monomer and the reactant, if any.

The method can include any useful amount of the reactant, polymer, and/or catalysts. In one non-limiting embodiment, a ratio of the reactant to the polymer is of from about 1:1 (w/w) to about 4:1 (w/w) (e.g., of from about 1:1 (w/w) to 2:1 (w/w), 1:1 (w/w) to 3:1 (w/w), 2:1 (w/w) to 4:1 (w/w), 2:1 (w/w) to 3:1 (w/w), 2:1 (w/w) to 4:1 (w/w), or 3:1 (w/w) to 4:1 (w/w)). In another non-limiting embodiment, a ratio of the catalyst to the polymer is of from about 1:10 (w/w) to about 1:80 (w/w) (e.g., of from about 1:10 (w/w) to 1:20 (w/w), 1:10 (w/w) to 1:25 (w/w), 1:10 (w/w) to 1:30 (w/w), 1:10 (w/w) to 1:40 (w/w), 1:10 (w/w) to 1:50 (w/w), 1:10 (w/w) to 1:60 (w/w), 1:10 (w/w) to 1:70 (w/w), 1:10 (w/w) to 1:75 (w/w), 1:15 (w/w) to 1:20 (w/w), 1:15 (w/w) to 1:25 (w/w), 1:15 (w/w) to 1:30 (w/w), 1:15 (w/w) to 1:40 (w/w), 1:15 (w/w) to 1:50 (w/w), 1:15 (w/w) to 1:60 (w/w), 1:15 (w/w) to 1:70 (w/w), 1:15 (w/w) to 1:75 (w/w), 1:15 (w/w) to 1:80 (w/w), 1:20 (w/w) to 1:25 (w/w), 1:20 (w/w) to 1:30 (w/w), 1:20 (w/w) to 1:40 (w/w), 1:20 (w/w) to 1:50 (w/w), 1:20 (w/w) to 1:60 (w/w), 1:20 (w/w) to 1:70 (w/w), 1:20 (w/w) to 1:75 (w/w), 1:20 (w/w) to 1:80 (w/w), 1:25 (w/w) to 1:30 (w/w), 1:25 (w/w) to 1:40 (w/w), 1:25 (w/w) to 1:50 (w/w), 1:25 (w/w) to 1:60 (w/w), 1:25 (w/w) to 1:70 (w/w), 1:25 (w/w) to 1:75 (w/w), 1:25 (w/w) to 1:80 (w/w), 1:30 (w/w) to 1:40 (w/w), 1:30 (w/w) to 1:50 (w/w), 1:30 (w/w) to 1:60 (w/w), 1:30 (w/w) to 1:70 (w/w), 1:30 (w/w) to 1:75 (w/w), 1:30 (w/w) to 1:80 (w/w), 1:40 (w/w) to 1:50 (w/w), 1:40 (w/w) to 1:60 (w/w), 1:40 (w/w) to 1:70 (w/w), 1:40 (w/w) to 1:75 (w/w), 1:40 (w/w) to 1:80 (w/w), 1:50 (w/w) to 1:60 (w/w), 1:50 (w/w) to 1:70 (w/w), 1:50 (w/w) to 1:75 (w/w), 1:50 (w/w) to 1:80 (w/w), 1:60 (w/w) to 1:70 (w/w), 1:60 (w/w) to 1:75 (w/w), 1:60 (w/w) to 1:80 (w/w), 1:70 (w/w) to 1:75 (w/w), 1:70 (w/w) to 1:80 (w/w), or 1:75 (w/w) to 1:80 (w/w)).

In another embodiment, the magnetic catalyst is present in an amount of from about 0.5 wt. % to about 20 wt. % (e.g., of from about 0.5 wt. % to 1 wt. %, 0.5 wt. % to 2 wt. %, 0.5 wt. % to 5 wt. %, 0.5 wt. % to 7 wt. %, 0.5 wt. % to 10 wt. %, 0.5 wt. % to 15 wt. %, 1 wt. % to 2 wt. %, 1 wt. % to 5 wt. %, 1 wt. % to 7 wt. %, 1 wt. % to 10 wt. %, 1 wt. % to 15 wt. %, 1 wt. % to 20 wt. %, 2 wt. % to 5 wt. %, 2 wt. % to 7 wt. %, 2 wt. % to 10 wt. %, 2 wt. % to 15 wt. %, 2 wt. % to 20 wt. %, 5 wt. % to 7 wt. %, 5 wt. % to 10 wt. %, 5 wt. % to 15 wt. %, 5 wt. % to 20 wt. %, 10 wt. % to 15 wt. %, 10 wt. % to 20 wt. %, and 15 wt. % to 20 wt. %).

The incubating step can be conducted under any useful experimental condition. In one embodiment, the incubating step is conducted at an elevated temperature. In some embodiments, the elevated temperature is of from about 150° C. to about 300° C. (e.g., from 150° C. to 160° C., 150° C. to 170° C., 150° C. to 180° C., 150° C. to 190° C., 150° C. to 200° C., 150° C. to 210° C., 150° C. to 220° C., 150° C. to 230° C., 150° C. to 240° C., 150° C. to 250° C., 150° C. to 260° C., 150° C. to 270° C., 150° C. to 280° C., 150° C. to 290° C., 160° C. to 170° C., 160° C. to 180° C., 160° C. to 190° C., 160° C. to 200° C., 160° C. to 210° C., 160° C. to 220° C., 160° C. to 230° C., 160° C. to 240° C., 160° C. to 250° C., 160° C. to 260° C., 160° C. to 270° C., 160° C. to 280° C., 160° C. to 290° C., 160° C. to 300° C., 170° C. to 180° C., 170° C. to 190° C., 170° C. to 200° C., 170°

C. to 210° C., 170° C. to 220° C., 170° C. to 230° C., 170° C. to 240° C., 170° C. to 250° C., 170° C. to 260° C., 170° C. to 270° C., 170° C. to 280° C., 170° C. to 290° C., 170° C. to 300° C., 180° C. to 190° C., 180° C. to 200° C., 180° C. to 210° C., 180° C. to 220° C., 180° C. to 230° C., 180° C. to 240° C., 180° C. to 250° C., 180° C. to 260° C., 180° C. to 270° C., 180° C. to 280° C., 180° C. to 290° C., 180° C. to 300° C., 190° C. to 200° C., 190° C. to 210° C., 190° C. to 220° C., 190° C. to 230° C., 190° C. to 240° C., 190° C. to 250° C., 190° C. to 260° C., 190° C. to 270° C., 190° C. to 280° C., 190° C. to 290° C., 190° C. to 300° C., 200° C. to 210° C., 200° C. to 220° C., 200° C. to 230° C., 200° C. to 240° C., 200° C. to 250° C., 200° C. to 260° C., 200° C. to 270° C., 200° C. to 280° C., 200° C. to 290° C., 200° C. to 300° C., 210° C. to 220° C., 210° C. to 230° C., 210° C. to 240° C., 210° C. to 250° C., 210° C. to 260° C., 210° C. to 270° C., 210° C. to 280° C., 210° C. to 290° C., 210° C. to 300° C., 220° C. to 230° C., 220° C. to 240° C., 220° C. to 250° C., 220° C. to 260° C., 220° C. to 270° C., 220° C. to 280° C., 220° C. to 290° C., 220° C. to 300° C., 230° C. to 240° C., 230° C. to 250° C., 230° C. to 260° C., 230° C. to 270° C., 230° C. to 280° C., 230° C. to 290° C., 230° C. to 300° C., 240° C. to 250° C., 240° C. to 260° C., 240° C. to 270° C., 240° C. to 280° C., 240° C. to 290° C., 240° C. to 300° C., 250° C. to 260° C., 250° C. to 270° C., 250° C. to 280° C., 250° C. to 290° C., 250° C. to 300° C., 260° C. to 270° C., 260° C. to 280° C., 260° C. to 290° C., 260° C. to 300° C., 270° C. to 280° C., 270° C. to 290° C., 270° C. to 300° C., 280° C. to 290° C., 280° C. to 300° C., or 290° C. to 300° C.). In other embodiment, the incubating step is conducted for a reaction period of from about 1 hour to about 12 hours (e.g., from 1 hour to 2 hours, 1 hour to 4 hours, 1 hour to 6 hours, 1 hour to 8 hours, 1 hour to 10 hours, 2 hours to 4 hours, 2 hours to 6 hours, 2 hours to 8 hours, 2 hours to 10 hours, 2 hours to 12 hours, 4 hours to 6 hours, 4 hours to 8 hours, 4 hours to 10 hours, 4 hours to 12 hours, 6 hours to 8 hours, 6 hours to 10 hours, 6 hours to 12 hours, 8 hours to 10 hours, 8 hours to 12 hours, or 10 hours to 12 hours).

Any useful magnetic field can be applied. In one non-limiting embodiment, a magnetic flux density of the magnetic field is of from about 100 Gs to about 20,000 Gs (e.g., of from about 100 Gs to 500 Gs, 100 Gs to 750 Gs, 100 Gs to 1,000 Gs, 100 Gs to 2,500 Gs, 100 Gs to 5,000 Gs, 100 Gs to 7,500 Gs, 100 Gs to 10,000 Gs, 100 Gs to 15,000 Gs, 500 Gs to 750 Gs, 500 Gs to 1,000 Gs, 500 Gs to 2,500 Gs, 500 Gs to 5,000 Gs, 500 Gs to 7,500 Gs, 500 Gs to 10,000 Gs, 500 Gs to 15,000 Gs, 500 Gs to 20,000 Gs, 750 Gs to 1,000 Gs, 750 Gs to 2,500 Gs, 750 Gs to 5,000 Gs, 750 Gs to 7,500 Gs, 750 Gs to 10,000 Gs, 750 Gs to 15,000 Gs, 750 Gs to 20,000 Gs, 1,000 Gs to 2,500 Gs, 1,000 Gs to 5,000 Gs, 1,000 Gs to 7,500 Gs, 1,000 Gs to 10,000 Gs, 1,000 Gs to 15,000 Gs, 1,000 Gs to 20,000 Gs, 2,000 Gs to 2,500 Gs, 2,000 Gs to 5,000 Gs, 2,000 Gs to 7,500 Gs, 2,000 Gs to 10,000 Gs, 2,000 Gs to 15,000 Gs, 2,000 Gs to 20,000 Gs, 3,000 Gs to 5,000 Gs, 3,000 Gs to 7,500 Gs, 3,000 Gs to 10,000 Gs, 3,000 Gs to 15,000 Gs, 3,000 Gs to 20,000 Gs, 4,000 Gs to 5,000 Gs, 4,000 Gs to 7,500 Gs, 4,000 Gs to 10,000 Gs, 4,000 Gs to 15,000 Gs, 4,000 Gs to 20,000 Gs, 5,000 Gs to 7,500 Gs, 5,000 Gs to 10,000 Gs, 5,000 Gs to 15,000 Gs, 5,000 Gs to 20,000 Gs, 6,000 Gs to 7,500 Gs, 6,000 Gs to 10,000 Gs, 6,000 Gs to 15,000 Gs, 6,000 Gs to 20,000 Gs, 7,000 Gs to 7,500 Gs, 7,000 Gs to 10,000 Gs, 7,000 Gs to 15,000 Gs, 7,000 Gs to 20,000 Gs, 8,000 Gs to 10,000 Gs, 8,000 Gs to 15,000 Gs, 8,000 Gs to 20,000 Gs, 9,000 Gs to 10,000 Gs, 9,000 Gs to 15,000 Gs, 9,000 Gs to 20,000 Gs, 10,000 Gs to 15,000 Gs, 10,000 Gs to 20,000 Gs, 11,000 Gs to 15,000 Gs, 11,000 Gs to 20,000 Gs, 12,000 Gs to 15,000 Gs, 12,000 Gs to 20,000 Gs, 13,000 Gs to 15,000 Gs, 13,000 Gs to 20,000 Gs, 14,000 Gs to 15,000 Gs, 14,000 Gs to 20,000 Gs, 15,000 Gs to 20,000 Gs, 16,000 Gs to 20,000 Gs, 17,000 Gs to 20,000 Gs, 18,000 Gs to 20,000 Gs, or 19,000 Gs to 20,000 Gs).

The method can include any useful further steps. In one non-limiting embodiment, the method includes adding a solvent to the reaction mixture (e.g., prior to the applying step). Exemplary solvents can include an aqueous solvent. In another non-limiting embodiment, the method includes using a magnetic catalyst to depolymerize a first polymer and then reusing the magnetic catalyst to depolymerize a second polymer (e.g., where the first polymer and the second polymer is the same or different).

Examples

Example 1: Magnetically Recoverable $Fe_3O_4$@ZIF-8 Catalysts for the Efficient Depolymerization of Poly(Ethylene Terephthalate)

Metal-organic frameworks (MOFs) that are made by inorganic and organic linkages exhibit flexibility in the structure of constituents' geometry, size, and functionality (see, e.g., Furukawa H et al., "The chemistry and applications of metal-organic frameworks," *Science* 2013; 341 (6149):1230444 (12 pp.)). The high surface areas, tunable pore metrics, and high density of active sites within the open structures of MOFs offer many advantages to their use in various applications, from gas storage and separation to functional devices (see, e.g., Lee J et al., "Metal-organic framework materials as catalyst," *Chem. Soc. Rev.* 2009; 38(5):1450-9; Meek S T et al., "Metal-organic frameworks: a rapidly growing class of versatile nanoporous materials," *Adv. Mater.* 2011; 23(2):249-67; Allendorf M D et al., "Luminescent metal-organic frameworks," *Chem. Soc. Rev.* 2009; 38(5):1330-52; Stavila V et al., "MOF-based electronic and opto-electronic devices," *Chem. Soc. Rev.* 2014; 43(16):5994-6010; and Stavila V et al., "MOF-based catalysts for selective hydrogenolysis of carbon-oxygen ether bonds," *ACS Catal.* 2016; 6(1):55-9).

Amongst different MOF applications, the study of catalysis is one of the most rapidly growing aspects due to MOFs effectively integrate the advantages of both homogeneous and heterogeneous catalysis, with high reaction efficiency and recyclability (see, e.g., Yang Q et al., "Metal-organic frameworks meet metal nanoparticles: synergistic effect for enhanced catalysis," *Chem. Soc. Rev.* 2017; 46(15):4774-808). MOFs are also used to perform size selective catalysis, support homogeneous catalysts, stabilize short-lived active species, and encapsulate metal nanoparticles within their pores (see, e.g., Lee J et al., *Chem. Soc. Rev.* 2009; 38(5): 1450-9). Tunable chiral MOFs have also been proposed as visible light-driven asymmetric catalysts (see, e.g., Zhang Y et al., "Tunable chiral metal organic frameworks toward visible light-driven asymmetric catalysis," *Sci. Adv.* 2017; 3(8):e1701162 (7 pp.)).

Zeolitic imidazolate frameworks (ZIFs) combine the highly desirable properties of both zeolites and metal-organic framework (MOFs), such as microporosity, high surface areas, exceptional thermal and chemical stability (see, e.g., Phan A et al., "Synthesis, structure, and carbon dioxide capture properties of zeolitic imidazolate frameworks," *Acc. Chem. Res.* 2010; 43(1):58-67), and tailored metal clusters or organic ligands have been widely utilized (see, e.g., Chang N et al., "Zeolitic imidazolate framework-8 nanocrystal coated capillary for molecular sieving of branched alkanes from linear alkanes along with high-resolution chromatographic separation of linear alkanes," *J. Am. Chem. Soc.* 2010; 132(39):13645-7; Brown A J et al., "Separation membranes: interfacial microfluidic processing of metal-organic framework hollow fiber membranes," *Science* 2014; 345(6192):72-5; and Banerjee R et al., "High-throughput synthesis of zeolitic imidazolate frameworks and application to $CO_2$ capture," *Science* 2008; 319(5865):939-43). Exemplary applications include those to address environmental issues such as $CO_2$ capture (see, e.g., Banerjee R et al., *Science* 2008; 319(5865):939-43), hydrogen sulfide capture (see, e.g., Shah M S et al., "Hydrogen sulfide capture: from absorption in polar liquids to oxide, zeolite, and metal-organic framework adsorbents and membranes," *Chem. Rev.* 2017; 117(14):9755-803), gas separation (see, e.g., Brown A J et al., *Science* 2014; 345(6192):72-5; and Kwon H T et al., "Heteroepitaxially grown zeolitic imidazolate framework membranes with unprecedented propylene/propane separation performances," *J. Am. Chem. Soc.* 2015; 137(38):12304-11), and water treatment (see, e.g., Li J et al., "Zeolitic imidazolate framework-8 with high efficiency in trace arsenate adsorption and removal from water," *J. Phys. Chem. C* 2014; 118(47):27382-7; and Li S et al., "Zeolitic imidazolate framework-8 derived nanoporous carbon as an effective and recyclable adsorbent for removal of ciprofloxacin antibiotics from water," *J. Hazard. Mater.* 2017; 321:711-9).

Recently, immobilization of ZIF materials on various substrates has been proposed as a promising new strategy to address challenges associated with their separation from reaction mixtures. Amongst them, iron oxide supported ZIFs have received recent attention due to their magnetic advantages of more selective and efficient (and often much faster) separation than centrifugation or filtration (see, e.g., Yavuz C T et al., "Low-field magnetic separation of monodisperse $Fe_3O_4$ nanocrystals," *Science* 2006; 314(5801):964-7). In addition to the facilitated separation property, they also exhibited excellent catalytic activities for numerous processes, including Knoevenagel condensation (see, e.g., Zhang T et al., "Synthesis of $Fe_3O_4$@ZIF-8 magnetic core-shell microspheres and their potential application in a capillary microreactor," *Chem. Eng. J.* 2013; 228:398-404; Pang F et al., "Controlled synthesis of $Fe_3O_4$/ZIF-8 nanoparticles for magnetically separable nanocatalysts," *Chem. Eur. J.* 2015; 21(18):6879-87; and Schejn A et al., "$Fe_3O_4$@ZIF-8L magnetically recoverable catalysts by loading $Fe_3O_4$ nanoparticles inside a zine imidazolate framework," *Dalton Trans.* 2015; 44(22):10136-40), hydrogenation (see, e.g., Liu P et al., "Core-shell-structured $Fe_3O_4$/Pd@ZIF-8 catalyst with magnetic recyclability and size selectivity for the hydrogenation of alkenes," *J. Mater. Sci.* 2017; 52(20):12121-30), and oxidation processes (see, e.g., Hou J et al., "Fabrication of hierarchical composite microspheres of copper-doped $Fe_3O_4$@ P4VP@ZIF-8 and their application in aerobic oxidation," *New J. Chem.* 2016; 40(12):10127-35). However, to the best of our knowledge, less effort has been made on their applications in polymer depolymerization and recycling.

Poly(ethylene terephthalate) (PET) is a semi-crystalline polyester with high strength, transparency, and thermal safety (see, e.g., López-Fonseca R et al., "Kinetics of catalytic glycolysis of PET wastes with sodium carbonate," *Chem. Eng. J.* 2011; 168(1):312-20). It is commercially used as a raw material for producing textiles, photographic films, high strength fibers and soft drink bottles (see, e.g., Al-Sabagh A M et al., "Greener routes for recycling of poly-ethylene terephthalate," *Egypt. J. Pet.* 2016; 25(1):53-64). Due to the relative chemical inertness of PET and microbial resistance (see, e.g., Yoshida S et al., "A bacterium that degrades and assimilates poly(ethylene terephthalate)," *Science* 2016; 351(6278):1196-9), the rapid accumulation of PET waste in ecosystems and oceans is a growing environmental challenge across the globe. The development and deployment of efficient PET depolymerization and recycling is therefore highly desirable to firstly, reduce the ever increasing volumes of PET polymer waste coming from various sources, and secondly, to generate value-added materials from low cost sources by converting them into valuable products.

It is known that the functional ester groups of PET can be cleaved in the presence of such reagents as water (hydrolysis), alcohols (alcoholysis), acids (acidolysis), glycols (glycolysis), and amines (aminolysis) (see, e.g., Sinha V et al., "Pet waste management by chemical recycling: a review," *J. Polym. Environ.* 2010; 18(1):8-25). Advantages of low-volatility solvents and continuous modes of operation make the glycolysis method one of the most promising PET depolymerization approaches known (see, e.g., Aldabalde V et al., "Organocatalyzed decarboxylation of naturally occurring cinnamic acids: potential role in flavoring chemicals production," *Open J. Phys. Chem.* 2011; 1(3):85-93). During the last decade, a variety of catalysts have also been explored for PET glycolysis, such as metal halides, hydroxides, phosphates and sulfates (see, e.g., Al-Sabagh A M et al., *Egypt. J. Pet.* 2016; 25(1):53-64). However, these catalysts typically require high catalyst loading levels, halide ions, excessive amounts of ethylene glycol (EG), and complex processes for separating the catalyst from the glycolysis products. Consequently, the cost-effective and environmentally friendly recycling of PET remains challenging.

Recently, Suo et al. demonstrated the potential application of ZIFs as catalysts in the glycolysis of PET (see, e.g., Suo Q et al., "The glycolysis of poly(ethylene terephthalate) promoted by metal organic framework (MOF) catalysts," *Catal. Lett.* 2017; 147(1):240-52). To obtain a moderate PET conversion yield, a high amount of ethylene glycol (EG:PET=5:1, (w/w)) was required that makes the process challenging in terms of catalyst separation and cost-efficiency. Herein, we demonstrate for the first time a convenient and environmentally benign protocol for the depolymerization of PET using magnetic ZIFs under low EG levels and halide-free processing conditions. ZIF-8 was chosen because of its outstanding chemical stability and excellent permanent porosity (see, e.g., Min X et al., "$Fe_3O_4$@ZIF-8: a magnetic nanocomposite for highly efficient $UO_2^{2+}$ adsorption and selective $UO_2^{2+}/Ln^{3+}$ separation," *Chem. Commun.* 2017; 53(30):4199-202; and Song Q et al., "Zeolitic imidazolate framework (ZIF-8) based polymer nanocomposite membranes for gas separation," *Energ. Environ. Sci.* 2012; 5(8):8359-69). At a 2 wt % of magnetic microsphere loading and low levels of EG (EG:PET=3:1, w/w), a 62% bis(2-hydroxyethyl) terephthalate (BHET) yield and a 100% conversion of PET were achieved. After the process, the $Fe_3O_4$@ZIF-8 can be readily separated from the solution using a magnet and reused. Additional details follow.

Example 2: Experimental Methods

Materials:

All of the chemicals were reagent grade and purchased from Sigma-Aldrich (St. Louis, Mo.) if not specified. The postconsumer water PET bottle (Mn 48083, Mw 78435 and PDI 1.63) was obtained by Costco Wholesale Corporation in USA, other types of PET samples with different crystalline (7% and 35%) were given by Rensselaer Polytechnic Institute (RPI), USA. All the PET samples are cut into 0.5×0.5 cm flakes before experiments.

Figure 1B:
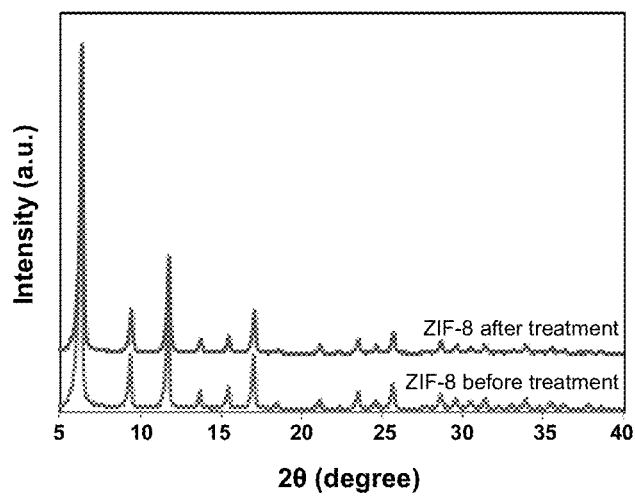
Figure 1C:
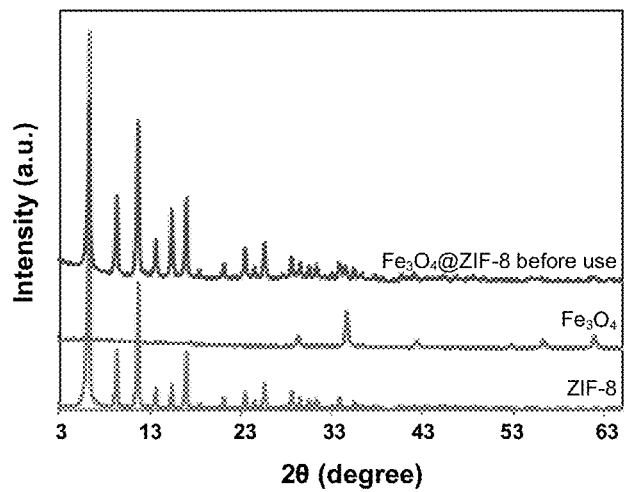
Figure 1D:
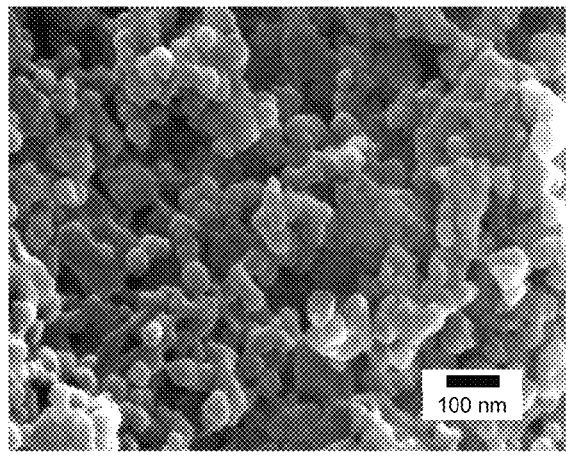
Figure 1E:
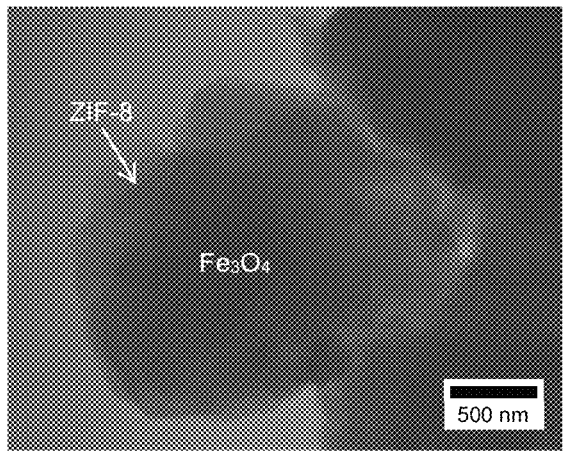
Figure 2A:
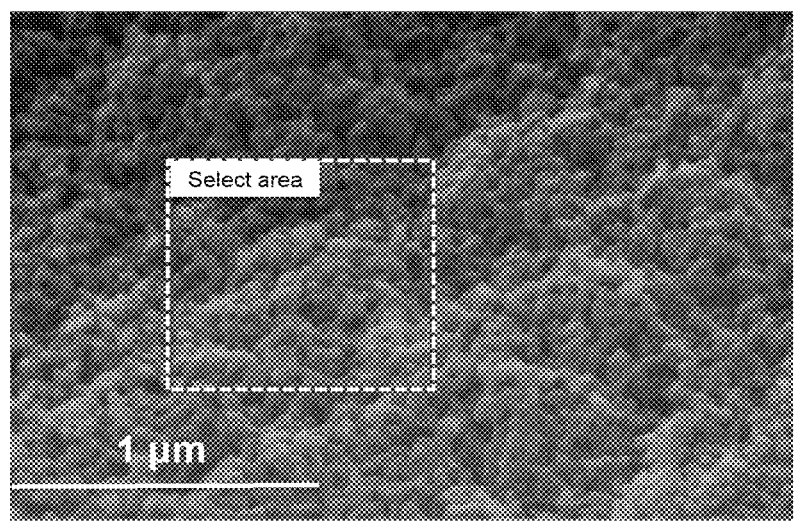
FIG. 2A-2D shows microscopy analysis of $Fe_3O_4$@ZIF-8. Provided are a scanning electron microscopy (SEM) image (FIG. 2A), an energy-dispersive x-ray spectroscopy (EDS) spectra (FIG. 2B), and EDS images (FIG. 2C-2D) of the region in FIG. 2A.
Figure 2B:
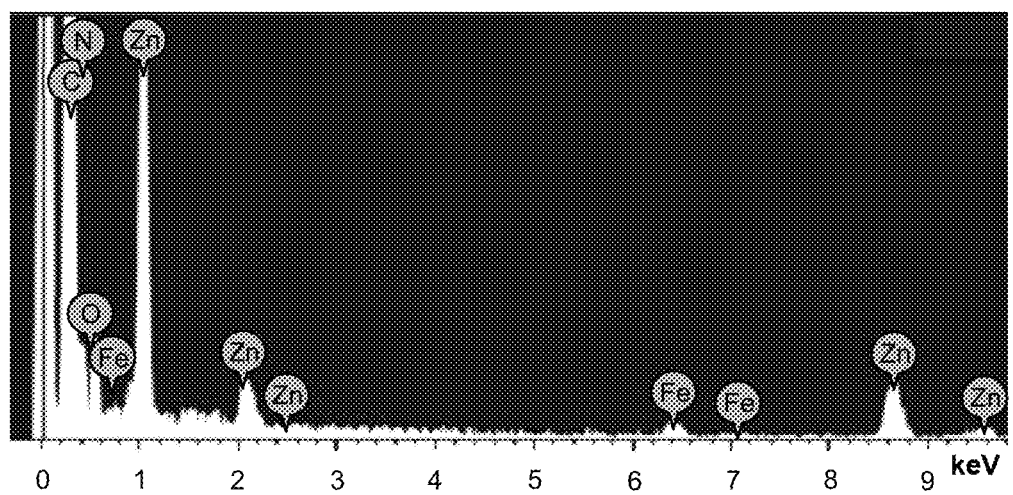
Figure 2C:
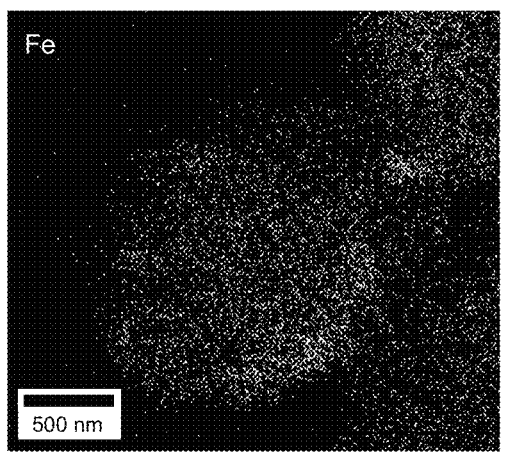
Figure 2D:
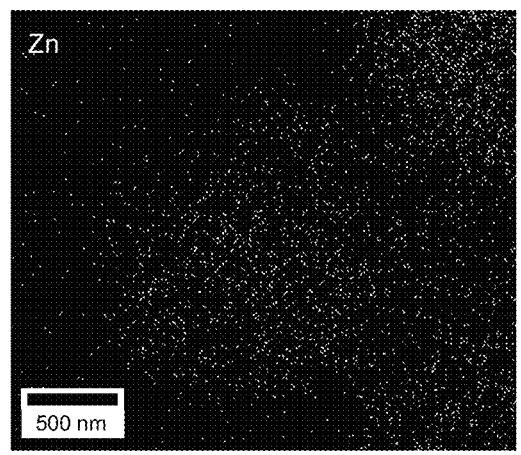

Preparation of ZIF-8:

ZIF-8 was synthesized based on the method described below. A mixture containing 300 mL of methanol, 2.25 g of zinc nitrate hexahydrate and 6.22 g of 2-methylimidazole was stirred at 50° C. for 3 days. After stirring, the resulting ZIF-8 particles were separated by centrifugation, followed by washing with methanol twice and then dried at 50° C. before use. Powder X-ray Diffraction (PXRD) patterns of the as-synthesized ZIF-8 was compared to those reported (see, e.g., Park K S et al., "Exceptional chemical and thermal stability of zeolitic imidazolate frameworks," *Proc. Nat'l Acad. Sci. USA* 2006; 103(27):10186-91; and Pan Y et al., "Rapid synthesis of zeolitic imidazolate framework-8 (ZIF-8) nanocrystals in an aqueous system," *Chem. Commun.* 2011; 47(7):2071-3), which indicated that the product was pure-phase and crystallized ZIF-8 material (see, e.g., FIG. 1B-1C). Next, a 10 wt % ZIF-8 EG solution was prepared and incubated at 180° C. for 15 h to verify the thermal stability of ZIF-8 in the presence of EG. The treated ZIF-8 was separated by centrifugation, followed by washing with methanol twice and then dried at 50° C. before compared with the fresh ZIF-8.

Preparation of $Fe_3O_4$@ZIF-8: The magnetic $Fe_3O_4$@ZIF-8 particles were synthesized via an adapted method according to the literature reported (see, e.g., Pang F et al., *Chem. Eur. J.* 2015; 21(18):6879-87; and Zhang T et al., *Chem. Eng. J.* 2013; 228:398-404). In a typical process, 0.1 g of nano $Fe_3O_4$ powder (<50 nm, Sigma Aldrich) was added to 100 mL aqueous solution of 1 wt % poly(styrene sulfonate) (PSS, sodium salt) (Sigma Aldrich) and then was under ultra-sonication for 45 min (the temperature of the system was maintained below 40° C. manually). The modified $Fe_3O_4$ sample was recovered by an external magnetic field, washed three times with deionized (DI) water, and then re-dispersed in a mixture containing 300 mL of methanol (Sigma Aldrich), 2.25 g of zinc nitrate hexahydrate (Sigma Aldrich), and 6.22 g of 2-methylimidazolate (Sigma Aldrich) under stirring. The reaction was allowed to proceed at 50° C. for 3 days to facilitate ZIF-8 shell growth. Finally, by the use of a magnet, the product was separated and washed with ethanol three times.

Preparation of Cholinium Phosphate:

In a typical process, phosphoric acid (85 wt % in $H_2O$) was added into choline hydroxide (46 wt % in $H_2O$) in a stoichiometry molar ratio of 1:3 under rigorous stirring in an ice bath. Thereafter, the solution was stirred for 24 h at room temperature. Water was removed from the solution under vacuum at 55° C.

Glycolysis of PET Catalyzed by $Fe_3O_4$@ZIF-8:

The catalytic degradation of PET was conducted in a 50-mL pressure tube (Ace Glass Inc., Vineland, N.J., USA). In a typical process, 0.5 g of PET flakes was mixed with 1.5 g of ethylene glycol and 0.01 g of $Fe_3O_4$@ZIF-8. The tube was immersed in an oil bath, and the reactions were carried out under atmospheric pressure at a specific temperature for a required time. When each glycolysis reaction was finished, residual PET, bis(hydroxyethyl) terephthalate (BHET) monomer, PET dimer, and PET oligomers were separated according to the method as reported (see, e.g., López-Fonseca R et al., *Chem. Eng. J.* 2011; 168(1):312-20). The conversion of PET (CPET) and yield of BHET (YBHET) are defined by the following equations (1) and (2), respectively:

$$C_{PET} = \frac{W_0 - W_1}{W_0} \times 100 \text{ and} \quad (1)$$

$$Y_{BHET} = \frac{\frac{W_{BHET}}{MW_{BHET}}}{\frac{W_{PET,I}}{MW_{PET}}} \times 100, \quad (2)$$

where $W_0$ is the initial weight of PET, $W_1$ is the weight of residual PET, $W_{BHET}$ is the weight of BHET, $W_{PET,I}$ is the initial weight of PET, $MW_{PET}$ is the molecular weight of PET repeating unit, and $MW_{BHET}$ is the molecular weight of BHET.

Recovery of the Catalyst:

In a typical process, 5 mL DI $H_2O$ was added into the slurry, $Fe_3O_4$@ZIF-8 was collected by a magnet and then was used directly for the next run.

Characterization with Gas Chromatography-Mass Spectrometry (GC/MS):

Identification of chemical compounds in PET solubilization and glycolysis products was carried out using an Agilent 6890N gas chromatograph equipped with an Agilent 5973N mass spectrometer. The capillary column was an Agilent DB-5MS (30 m×0.25 mm×0.25 μm). The injection temperature was 250° C., and the oven temperature was programmed to hold at 100° C. for 1 minute, ramp to 300° C. at 10° C. min$^{-1}$, and then hold for additional 10 minutes.

Characterization with Power X-Ray Detection (PXRD):

PXRD measurements were performed on a PANalytical Empyrean diffractometer equipped with a PIXcel3D detector and operated at 40 kV and 40 kA using Cu Kα radiation (λ=1.5406 Å). A reflection-transmission spinner was used as a sample holder and the spinning rate was set at 4 rpm. The patterns were collected in the 2θ range of 5° to 75° with a step size of 0.026°.

PET Molecular Analysis:

The number-average molecular weight (Mn), weight-average molecular weight (Mw) and its distribution (PDI=Mw/Mn) were determined by Gel Permeation Chromatography (GPC) performed on an Agilent PL-GPC 50 device equipped with one guard column (PLgel 5 μm, 50×7.5 mm) and two mixed columns (PLgel 5 μm MIXED-C and MIXED-D, 300×7.5 mm). Chloroform was used as eluent with a flow rate of 1.0 mL/min at 30° C. and polystyrene was used to establish a calibration curve. To prepare the sample for GPC, PET was dissolved in orthochlorophenol at 90° C. followed by the addition of four times amount of chloroform. The corresponding results were summarized in Table 1 below.

TABLE 1

Average molecular weight of various PET samples.

| Sample | Mn [g/mol] | Mw [g/mol] | PDI |
|---|---|---|---|
| Post consumer bottle PET | 48083 | 78435 | 1.63 |
| PET with 7% crystallinity | 48934 | 82092 | 1.68 |
| PET with 35% crystallinity | 37936 | 64500 | 1.7 |

Scanning Electron Microscopy (SEM) and Transmission Electron Microscopy (TEM) Analysis:

Observation of the morphology of the samples was conducted on a scanning electron microscopy (SEM, Merlin VP Compact) and a transmission electron microscopy (TEM, JEM-2010F) at 200 kV, respectively. The samples for TEM characterization were dispersed in ethanol and deposited on an ultrathin carbon film coated on a 300-mesh Cu grid.

Example 3: Characterization of Exemplary Magnetic $Fe_3O_4$@ZIF-8 Microparticles ZIF-8 and magnetic $Fe_3O_4$@ZIF-8 particles (FIG. 1A) were synthesized via in situ formation and growth of ZIF-8 on the surface of nano $Fe_3O_4$ according to an adapted method based on a previous report (see, e.g., Zhang T et al., Chem. Eng. J. 2013; 228:398-404) and as described in Example 2 herein. The as-synthesized ZIF-8 powder x-ray diffraction (PXRD) pattern was identical to those previously reported (see, e.g., Park K S et al., Proc. Nat'l Acad. Sci. USA 2006; 103(27):10186-91; and Pan Y et al., Chem. Commun. 2011; 47(7):2071-3) and indicates that the product is pure and crystalline (see, FIG. 1B, labeled "ZIF-8 before treatment"). A 10 wt % ZIF-8 EG solution was prepared and exposed to 180° C. for 15 h to verify the thermal stability of ZIF-8 in the presence of EG. The treated ZIF-8 was separated by centrifugation, followed by washing with methanol twice and then dried at 50° C. before compared with the fresh ZIF-8. The result (FIG. 1B) confirms that ZIF-8 remains unchanged in terms of structure after the treatment.

The crystal structure of the as-synthesized $Fe_3O_4$@ZIF-8 microspheres was confirmed by PXRD measurement (FIG. 1C) and includes the characteristic peaks of both $Fe_3O_4$ and ZIF-8 in $Fe_3O_4$@ZIF-8. Scanning electron microscopy (SEM), transmission electron microscopy (TEM), and energy-dispersive x-ray spectroscopy (EDS) characterizations of the $Fe_3O_4$@ZIF-8 and the results (FIGS. 1D-1E and FIGS. 2A-2D) reveal the microstructure of $Fe_3O_4$@ZIF-8 and the growth of ZIF-8 on the surface of $Fe_3O_4$, respectively.

Figure 3:
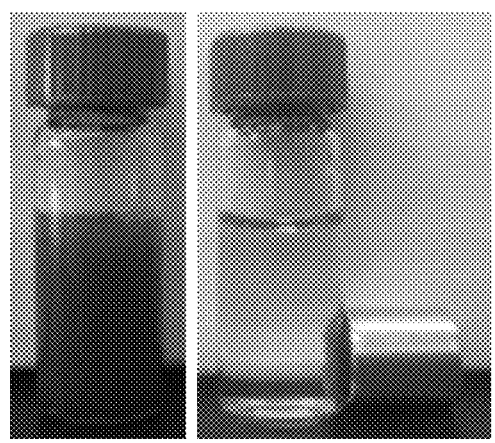
FIG. 3 is a photograph showing magnetic separation of $Fe_3O_4$@ZIF-8 from a 0.5 wt % aqueous suspension.

The separation of the synthesized $Fe_3O_4$@ZIF-8 particle was tested before it was used for PET glycolysis. We prepared a 0.5 wt % $Fe_3O_4$@ZIF-8 aqueous solution in deionized (DI) water at room temperature with the assistance of ultra-sonication (30 min.). As shown in FIG. 3, the $Fe_3O_4$@ZIF-8 particles were well dispersed and can be easily separated from the aqueous solution by using a tandem permanent magnet (~14,800 Gs) at ~23° C. within 30 seconds of exposure.

Example 4: Depolymerization of Polyethylene Terephthalate) (PET)

The depolymerization of poly(ethylene terephthalate) (PET) through glycolysis was carried out in the presence of ethylene glycol (EG) and different catalysts. The amount of catalyst used was 2 wt. % relative to the mass of PET. Results are shown below in Table 2. The glycolysis reaction of PET does not proceed without catalyst under the desired conditions (i.e. 180° C., 5 h) (Table 2, entry 1). Neither does the reaction proceed in the presence of $Fe_3O_4$ nanoparticles under the same conditions (Table 2, entry 2) (see, e.g., Xuan S et al., "Synthesis of biocompatible, mesoporous $Fe_3O_4$ nano/microspheres with large surface area for magnetic resonance imaging and therapeutic applications," ACS Appl. Mater. Interfaces 2011; 3(2):237-44). It is known that $Fe_3O_4$ can catalyze the PET glycolysis reaction, but only at 300° C. or higher (see, e.g., Bartolome L et al., "Superparamagnetic γ-$Fe_2O_3$ nanoparticles as an easily recoverable catalyst for the chemical recycling of PET," Green Chem. 2014; 16(1): 279-86). Our results clearly indicate that ZIF-8 is the main catalyst for the glycolytic depolymerization of PET at 180° C. (Table 2, entry 3).

TABLE 2

PET glycolysis performance of various catalysts and conditions.[a]

| Entry | Catalyst | EG [g] | PET conv. [%] | BHET yield [%] |
|---|---|---|---|---|
| 1 | — | 1.5 | trace | trace |
| 2 | Nano $Fe_3O_4$ | 1.5 | trace | trace |
| 3 | ZIF-8 | 1.5 | 100 | 62.1 |
| 4 | $Fe_3O_4$@ZIF-8 | 1.5 | 100 | 62.1 |
| 5 | $Zn(NO_3)_2·6H_2O$ | 1.5 | 46 | 35.3 |
| 6 | 2-MIm | 1.5 | 10 | 10.0 |
| 7[b] | $[Ch]_3[PO_4]$ | 2 | 100 | 60.6 |
| 8 | $Fe_3O_4$@ZIF-8 | 0.5 | 20.8 | 15.8 |
| 9 | $Fe_3O_4$@ZIF-8 | 1.0 | 60.0 | 45.4 |
| 10 | $Fe_3O_4$@ZIF-8 | 2.0 | 100 | 65.5 |
| 11[c] | $Fe_3O_4$@ZIF-8 | 1.5 | 100 | 61.2 |
| 12[d] | $Fe_3O_4$@ZIF-8 | 1.5 | 100 | 61.1 |

[a]500 mg of PET, 1.5 g of EG, 0.01 g of $Fe_3O_4$@ZIF-8, 180° C., 5 hours, unless otherwise indicated as b, c, or d
[b]100 mg of $[Ch]_3[PO_4]$, 2 g of EG (see, e.g., Sun J et al., "Solubilization and upgrading of high polyethylene terephthalate loadings in a low-cost bifunctional ionic liquid," ChemSusChem 2018;11(4):781-92)
[c]PET (7% crystalline)
[d]PET (30% crystalline)

Figure 4A:
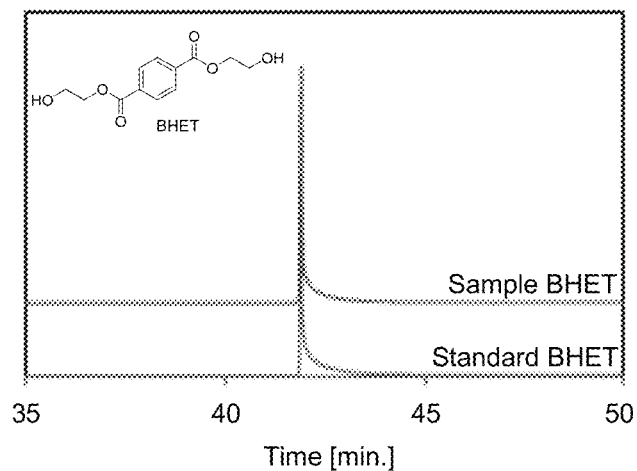
FIG. 4A-4B shows gas chromatography/mass spectrometry (GC/MS) spectra of standard bis(hydroxyethyl) terephthalate (BHET) monomer (FIG. 4A) and produced BHET (FIG. 4B).
Figure 4B:
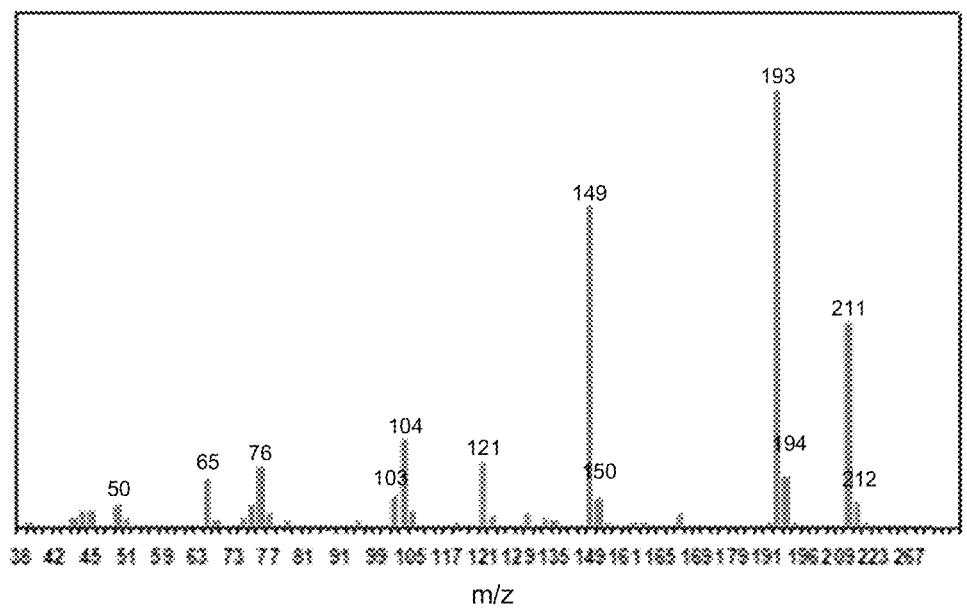

Without wishing to be limited by mechanism, the high activity of ZIF-8 is probably attributed to its abundant active zinc sites (e.g., $Zn^{2+}$) and the synergistic catalysis of $Zn^{2+}$ ions and imidazolium rings (see, e.g., Zhou X et al., "Effective catalysis of poly(ethylene terephthalate) (PET) degradation by metallic acetate ionic liquids," Pure Appl. Chem. 2012; 84(3):789-801; Wang Q et al., "First-row transition metal-containing ionic liquids as highly active catalysts for the glycolysis of poly(ethylene terephthalate) (PET)," ACS Sustainable Chem. Eng. 2015; 3(2):340-8; and Wang Q et al., "Deep eutectic solvents as highly active catalysts for the fast and mild glycolysis of poly(ethylene terephthalate) (PET)," Green Chem. 2015; 17(4):2473-9). Since zinc nitrate and 2-methylimidazole have a much lower catalytic activity (about 46% and 10% conversion, respectively), it is possible that the high conversion efficiency observed in the presence of ZIF-8 is caused by the synergistic roles of $Zn^{2+}$ and imidazole sites in the activation of the C—O bonds in PET and/or the O—H bonds in EG, respectively (see, e.g., Wang Q et al., Green Chem. 2015; 17(4):2473-9; and Hertag L et al., "Diffusion of $CH_4$ and $H_2$ in ZIF-8," J. Membr. Sci. 2011; 377(1-2):36-41). ZIF-8 remains highly active after being immobilized on the surface of the $Fe_3O_4$ nanoparticles. At lower ZIF-8 concentrations, $Fe_3O_4$@ZIF-8 core-shell nanoparticles exhibit comparable activity (e.g., 100% PET conversion) with the single ZIF-8 and 10 times higher than $[Ch]_3[PO_4]$ (Table 2, entry 4 vs. 3 and 7). To the best of our knowledge, this is the first report of a magnetic ZIF as an active catalyst for glycolytic PET depolymerization. The main product of bis(2-hydroxyethyl) terephthalate (BHET) was identified by GC/MS (FIGS. 4A-4B), and others were PET dimer and oligomers as mentioned in our previous work (see, e.g., Sun J et al., ChemSusChem 2018; 11(4):781-92).

The precursor materials for ZIF-8, such as zinc nitrate hexahydrate ($Zn(NO_3)_2.6H_2O$) and 2-methylimidazole (2-MIm), show lower glycolytic activities (Table 2, entries 5 and 6 vs. 4). As reported previously, ZIF-8 holds an intersecting three-dimensional structural feature, where Zn(II) is coordinated in a tetrahedral structure by four 2-methylimidazolate linkers (see, e.g., Hertag L et al., J. Membr. Sci. 2011; 377(1-2):36-41). Without wishing to be limited by mechanism, it is possible that the depolymerization reaction is catalyzed by structurally identical single sites on the surface of ZIF-8 (see, e.g., Rogge S M J et al, "Metal-organic and covalent organic frameworks as single-site catalysts," *Chem. Soc. Rev.* 2017; 46(11):3134-84).

Figure 5:
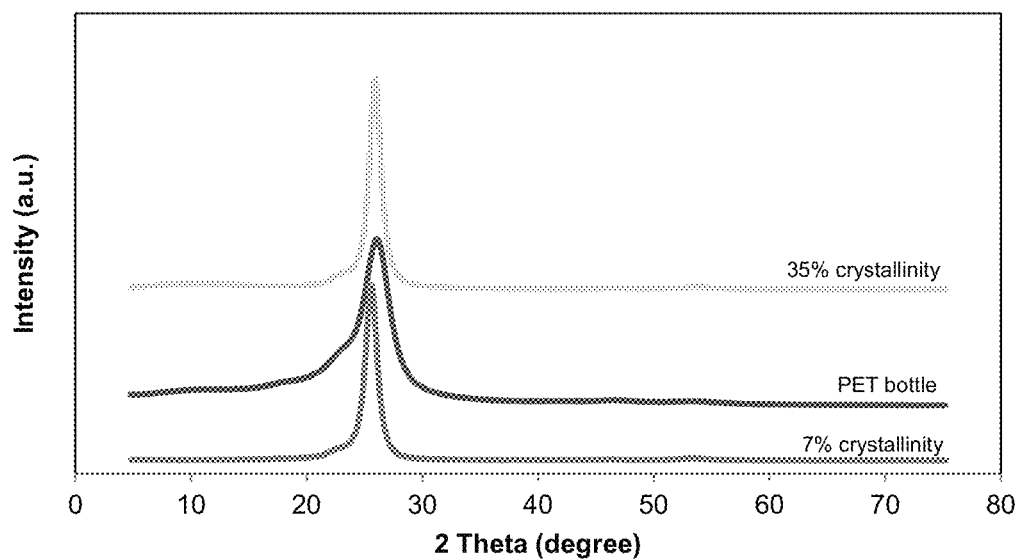
FIG. 5 shows power X-ray detection (PXRD) spectra of various poly(ethylene terephthalate) (PET) samples.

The results indicate that the synergistic role of the $Zn^{2+}$ cation and the imidazole framework plays an important role on the catalytic reaction as compared to their single compounds. $Zn(NO_3)_2 \cdot 6H_2O$ exhibits higher activity than 2-MIm (Table 2, entries 5-6) which means that $Zn^{2+}$ possess the main catalytic role for PET glycolysis. Increasing the amount of EG amount present from 0.5 g to 2.0 g the PET conversion increased from 20.8% to 100%, and the corresponding BHET yield increased from 15.8% to 65.6% (Table 2, entries 8-10). The catalyst shows a comparable activity to PET with different crystallinity and molecular weights (Table 1 and Table 2, entries 11-12 vs. 4) indicating a good applicability to polyester depolymerization. FIG. 5 shows PXRD analysis of PET with different crystallinity and molecular weights.

The kinetic study of PET glycolysis catalyzed by $Fe_3O_4$@ZIF-8 microspheres was conducted on the basis of conversion of PET at various temperatures (170° C., 175° C., 180° C., and 186° C.). Based on the previous reports (see, e.g., López-Fonseca R et al., *Chem. Eng. J.* 2011; 168(1):312-20; Suo Q et al., *Catal. Lett.* 2017; 147(1):240-52; and Wang H et al., "Degradation of poly(ethylene terephthalate) using ionic liquids," *Green Chem.* 2009; 11(10):1568-75), we assumed the present PET glycolysis reaction is a first-order kinetic process. The velocity constant of PET depolymerization was calculated using equation (3):

$$k = \frac{1}{t}\ln\frac{1}{1-x}, \quad (3)$$

where x represents the degree of conversion of PET at reaction time t, and k represents the velocity constant of the process. Based on the data presented in FIG. 6, the linear regression results are shown in Table 3. The good linear coefficients indicate that PET glycolysis follows a first-order kinetic reaction. The straight line fitted to the data points, as shown in FIG. 6, give slopes of 0.119 $h^{-1}$, 0.3194 $h^{-1}$, 0.5646 $h^{-1}$, and 0.9978 $h^{-1}$, respectively, corresponding to reaction at temperatures of 170° C., 175° C., 180° C. and 186° C., respectively.

TABLE 3

Figure 6:
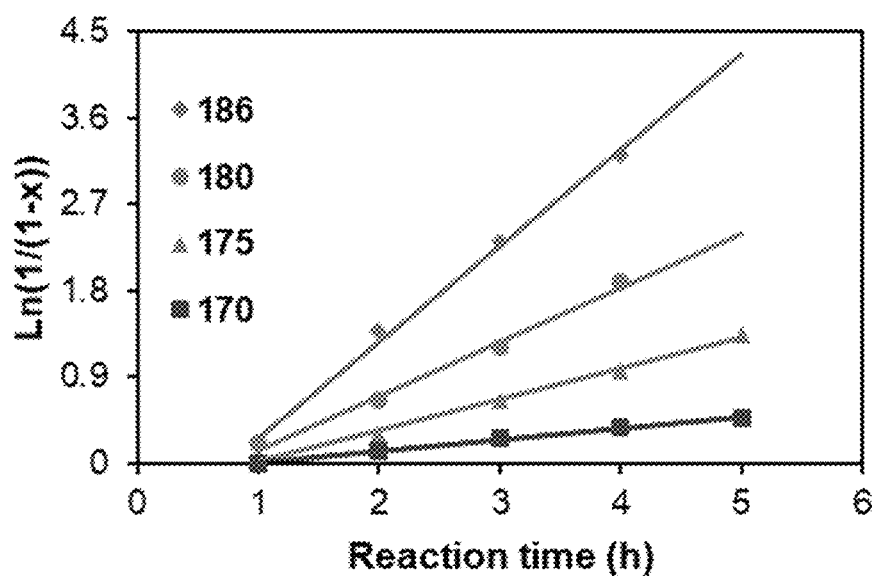
FIG. 6 shows the effect of reaction temperature (170° C., 175° C., 180° C., and 186° C.) on the glycolysis rate of PET catalyzed by $Fe_3O_4$@ZIF-8.

Linear regression results of the data in FIG. 6.

| T [° C.] | Regressive equation | Linear coefficient ($R^2$) |
|---|---|---|
| 170 | y = 0.1190x − 0.1104 | 0.998 |
| 175 | y = 0.3194x − 0.2875 | 0.993 |
| 180 | y = 0.5646x − 0.4231 | 0.991 |
| 186 | y = 0.9978x − 0.7178 | 0.996 |

Figure 7:
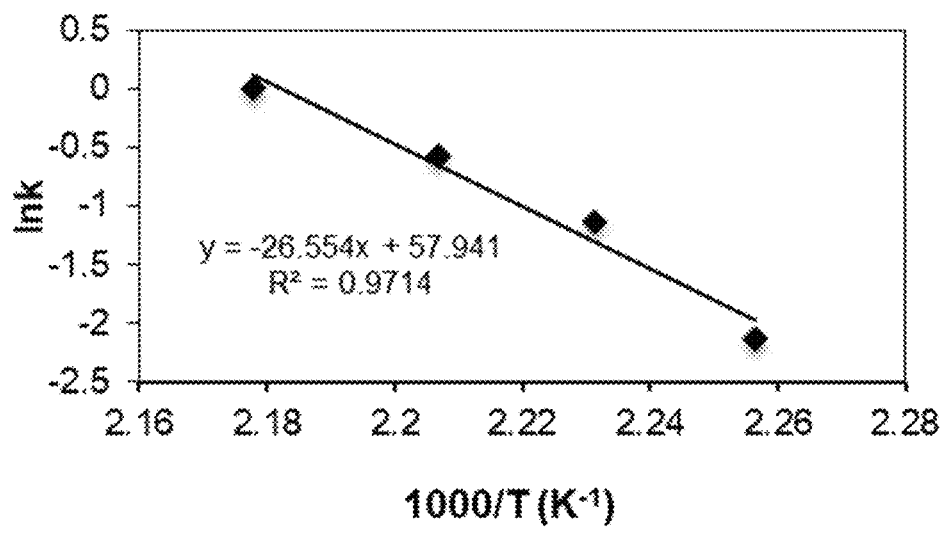
FIG. 7 shows an Arrhenius plot of rate constant of the glycolysis of PET catalyzed by $Fe_3O_4$@ZIF-8.

Various kinetic parameters were calculated according to equation 4:

$$\ln k = \ln A - \frac{E_a}{RT}, \quad (4)$$

where k is the calculated rate constant, A is the Arrhenius constant, Ea is the apparent activation energy, R is the universal gas constant, and T is the reaction temperature. According to the relationship of the calculated rate constant with reaction temperature (T) (equation 4), the Arrhenius plot of the rate constant for the glycolysis of PET catalyzed by $Fe_3O_4$@ZIF-8 is shown in FIG. 7. The calculated Ea for this reaction is 220.7 kJ $mol^{-1}$, and the calculated A determined from the intercept is around $1.2 \times 10^{25}$ $h^{-1}$. The high Ea level might be due to the poor immersion of PET in the presence of low EG level and indicates the inherent difficulty of PET degradation.

Figure 8A:
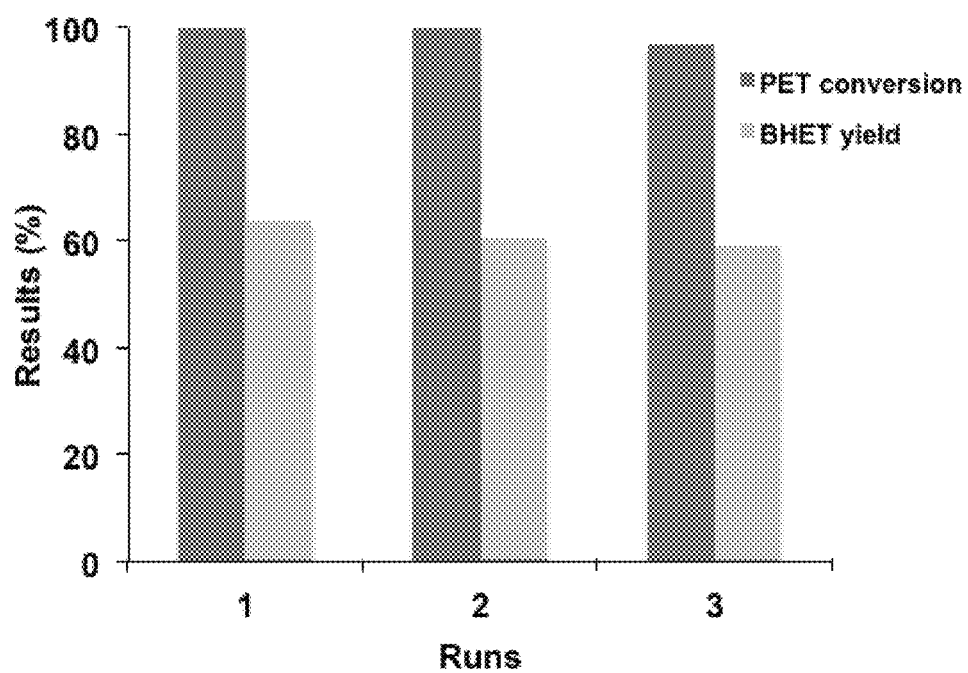
FIG. 8A-8B shows the reusability of $Fe_3O_4$@ZIF-8 in PET glycolysis for three reaction cycles (FIG. 8A) and PXRD patterns of $Fe_3O_4$@ZIF-8 microspheres before and after use (FIG. 8B).
Figure 8B:
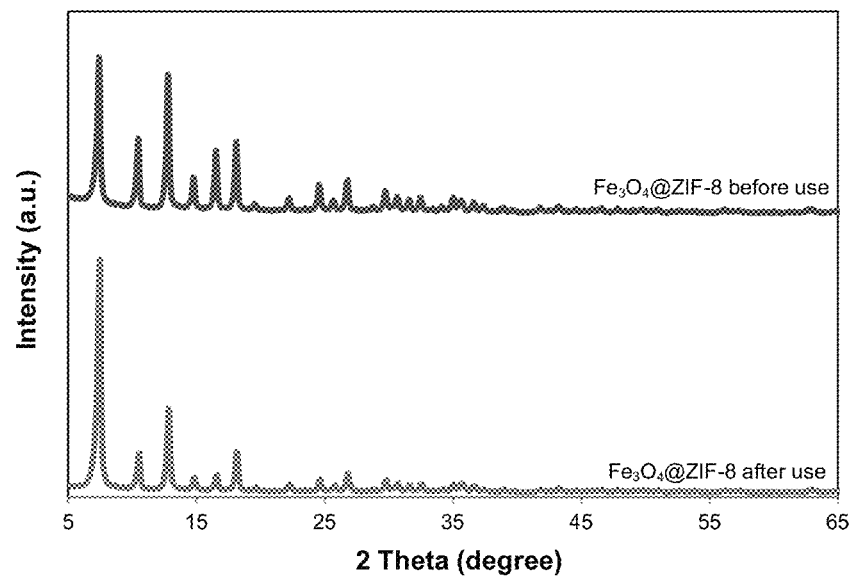

Tests of the reusability of the magnetic $Fe_3O_4$@ZIF-8 catalyst in the glycolysis of PET were conducted using the optimal glycolytic conditions of 180° C. and 5 h. After the reaction is complete, the catalyst was easily separated by using a magnet and, after resolubilization, was used for the next run. FIG. 8A shows that the $Fe_3O_4$@ZIF-8 could be reused at least three times with high activities in terms of PET conversion and BHET yield. The PXRD patterns of $Fe_3O_4$@ZIF-8 before and after confirming that the structure of the catalyst remains unchanged after the reaction (FIG. 8B).

In summary, we demonstrated that $Fe_3O_4$@ZIF-8 displays excellent catalytic activity in PET glycolysis. The catalytic reaction occurs at a relatively low EG dosage (EG:PET=3:1 (w/w)) with 100% of PET conversion and a high yield of bis(2-hydroxyethyl) terephthalate of 62%. The high efficiency of the $Fe_3O_4$@ZIF-8 catalyst is likely caused by the synergistic role of zinc site and imidazole in the activation of C—O bond of PET and/or of O—H bond of EG. Notably, the use of magnetic iron oxide allowed the easy recovery of the catalyst, allowing the catalyst can be reused without a significant loss in activity. High thermal stabilities of both ZIF-8 and $Fe_3O_4$@ZIF-8 in EG as well as their excellent catalytic performances on depolymerization of postconsumer plastics open a potential industrial application of MOFs as environmentally benign cost-effective and recoverable catalysts to address environmental issues.

Other Embodiments

All publications, patents, and patent applications mentioned in this specification are incorporated herein by reference to the same extent as if each independent publication or patent application was specifically and individually indicated to be incorporated by reference.

While the invention has been described in connection with specific embodiments thereof, it will be understood that it is capable of further modifications and this application is intended to cover any variations, uses, or adaptations of the invention following, in general, the principles of the invention and including such departures from the present disclosure that come within known or customary practice within the art to which the invention pertains and may be applied to the essential features hereinbefore set forth, and follows in the scope of the claims.

Other embodiments are within the claims.

The invention claimed is:

1. A method for depolymerizing a polymer, the method comprising:
   providing the polymer and a reactant in the presence of a magnetic catalyst, wherein the magnetic catalyst comprises a magnetic core and a shell comprising a metal-organic framework;
   incubating the polymer and the magnetic catalyst at an elevated temperature, thereby forming a monomer within a reaction mixture; and
   applying a magnetic field, thereby separating the magnetic catalyst from the monomer and the reactant, if any.

2. The method of claim 1, wherein the polymer comprises poly(ethylene terephthalate) (PET), poly (ethylene terephthalate)-glycol (PETG), poly(trimethylene terephthalate) (PTT), poly(propylene terephthalate) (PPT), poly(butylene terephthalate) (PBT), poly(cyclohexylene terephthalate), poly(cyclohexylenedimethylene terephthalate) (PCT), or a copolymer thereof.

3. The method of claim 1, wherein the reactant comprises an alcohol or a diol.

4. The method of claim 1, wherein a ratio of the reactant to the polymer is of from about 1:1 (w/w) to about 4:1 (w/w).

5. The method of claim 1, wherein the magnetic core comprises an iron oxide.

6. The method of claim 5, wherein the magnetic core comprises an anionic surface.

7. The method of claim 1, wherein the magnetic core comprises an iron oxide particle, a mixed metal oxide particle, a metal-decorated iron oxide particle, reduced metal particle, or a metal alloy particle.

8. The method of claim 7, wherein the metal-organic framework comprises a zeolitic imidazolate framework.

9. The method of claim 1, wherein the magnetic catalyst comprises a core-shell nanoparticle or a core-shell microparticle.

10. The method of claim 1, wherein the magnetic core comprises a nanoparticle.

11. The method of claim 1, wherein a ratio of the magnetic catalyst to the polymer is of from about 1:10 (w/w) to about 1:80 (w/w).

12. The method of claim 1, wherein the magnetic catalyst is present in an amount of from about 0.5 wt. % to about 10 wt. %.

13. The method of claim 1, wherein the elevated temperature is of from about 150° C. to about 250° C.

14. The method of claim 13, wherein the incubating step is conducted for a period of from about 1 hour to about 6 hours.

15. The method of claim 1, wherein a magnetic flux density of the magnetic field is of from about 100 Gs to about 20,000 Gs.

16. The method of claim 1, wherein the monomer comprises a terephthalate, a hydroxyalkyl terephthalate, or a bis(hydroxyalkyl) terephthalate.

17. The method of claim 1, further comprising, prior to the applying step:
adding a solvent to the reaction mixture.

18. The method of claim 17, wherein the solvent comprises an aqueous solvent.

19. A method for depolymerizing a polymer, the method comprising:
providing a first polymer and a reactant in the presence of a magnetic catalyst, wherein the magnetic catalyst comprises a magnetic core and a shell comprising a metal-organic framework;
incubating the first polymer and the magnetic catalyst at an elevated temperature, thereby forming a first monomer within a reaction mixture;
applying a magnetic field, thereby separating the magnetic catalyst from the first monomer and the reactant, if any; and
reusing the magnetic catalyst to depolymerize a second polymer, wherein the first polymer and the second polymer is the same or different.

20. A method for depolymerizing a polymer, the method comprising:
providing a first polymer and a reactant in the presence of a magnetic catalyst, wherein the magnetic catalyst comprises a magnetic core and a shell comprising a metal-organic framework;
incubating the first polymer and the magnetic catalyst at an elevated temperature, thereby forming a first monomer within a reaction mixture;
adding a solvent to the reaction mixture;
applying a magnetic field, thereby separating the magnetic catalyst from the first monomer and the reactant, if any; and
reusing the magnetic catalyst to depolymerize a second polymer, wherein the first polymer and the second polymer is the same or different.

* * * * *